United States Patent [19]
Kralj et al.

[11] Patent Number: 5,971,592
[45] Date of Patent: *Oct. 26, 1999

[54] INTEGRATED REUSABLE PALLET HAVING DATA COLLECTION DEVICES AND METHOD FOR USING SHIPPING CONVEYANCES

[76] Inventors: Nicholas L. Kralj, 687 Lakeview Rd., Watsonville, Calif. 95076; Gary A. Upson, 5229 Rio Lobo Dr., San Jose, Calif. 95136

[*] Notice: This patent issued on a continued prosecution application filed under 37 CFR 1.53(d), and is subject to the twenty year patent term provisions of 35 U.S.C. 154(a)(2).

[21] Appl. No.: 08/714,931

[22] Filed: Sep. 27, 1996

Related U.S. Application Data

[62] Division of application No. 08/027,838, Mar. 8, 1993, Pat. No. 5,662,048.

[51] Int. Cl.$^6$ .............................. G06F 17/00; G06G 7/48
[52] U.S. Cl. .............................. 364/478.13; 364/468.22; 364/468.24; 364/478.12; 364/478.09
[58] Field of Search ............... 364/478.13, 478.14, 364/478.15, 468.2, 468.23, 468.19, 478.07, 478.09, 478.12; 108/56.1, 56.3, 403; 340/572, 235, 505, 825.71, 825.72, 825.31

[56] References Cited

U.S. PATENT DOCUMENTS

| | | | |
|---|---|---|---|
| 2,503,020 | 4/1950 | Benoist et al. | 108/51.1 |
| 2,699,912 | 1/1955 | Cushman | 248/120 |
| 2,918,241 | 12/1959 | Maher | 248/120 |
| 3,637,989 | 1/1972 | Howard et al. | 235/61.7 |
| 3,650,224 | 3/1972 | Petix et al. | 108/51 |
| 3,683,823 | 8/1972 | Schmid | 108/156 |
| 3,696,761 | 10/1972 | Brown | 108/53 |
| 3,878,793 | 4/1975 | Morrison | 108/56 |
| 3,958,102 | 5/1976 | Burt | 235/61.6 |
| 4,128,253 | 12/1978 | Powers | 280/79.1 |
| 4,189,125 | 2/1980 | Little | 248/346 |
| 4,267,781 | 5/1981 | Powers | 108/56.1 |
| 4,418,411 | 11/1983 | Strietzel | 371/67 |
| 4,497,260 | 2/1985 | Bucher | 108/56.1 |
| 4,672,553 | 6/1987 | Goldberg | 364/478 |
| 4,799,621 | 1/1989 | Reith | 237/2 A |
| 4,804,087 | 2/1989 | Smith | 206/335 |
| 4,829,428 | 5/1989 | Weitzman et al. | 364/401 |
| 4,843,640 | 6/1989 | Juengel | 455/604 |
| 4,911,217 | 3/1990 | Dunn et al. | 152/152.1 |
| 4,967,400 | 10/1990 | Woods | 367/21 |
| 5,021,767 | 6/1991 | Fockens et al. | 340/572 |
| 5,038,283 | 8/1991 | Caveney | 364/403 |
| 5,094,175 | 3/1992 | Christie | 108/56.1 |
| 5,485,369 | 1/1996 | Nicholls et al. | 364/401 |
| 5,535,407 | 7/1996 | Yanagawa et al. | 395/800 |
| 5,631,827 | 5/1997 | Nicholls et al. | 395/228 |

FOREIGN PATENT DOCUMENTS

| | | | |
|---|---|---|---|
| 1114755 | 12/1981 | Canada | 108/56.1 |
| 21013463 | 3/1972 | France | 108/56.3 |
| 6191533 | 7/1994 | Japan | 108/56.1 |

OTHER PUBLICATIONS

"Off The Shelf Savings: The Benefits of Today's Data Collection Systems", by Bryan Deagon, *Investors Business Daily*.
SPI, intoduction(From 10 Database Management System), Jan. 1, 1980, Arden, Bruce W.
SPI, Automated Parts–Handling System, Jun. 1985.
SPI, Computrers and Industrial Engineering, Jan. 1, 1986, Sammet., Jean.

*Primary Examiner*—William Grant
*Assistant Examiner*—Ramesh Patel
*Attorney, Agent, or Firm*—Blakely, Sokoloff, Taylor & Zafman

[57] ABSTRACT

A method for inventory and shipping control allowing for the tracking and control of reusable items having data storage devices by the storage and retrieval of data onto the data storage device of the reusable item. The method for inventory and shipping control is described as it relates to the tracking of pallets.

8 Claims, 24 Drawing Sheets

INTEGRATED REUSABLE PALLET HAVING DATA COLLECTION DEVICES AND METHOD FOR USING SHIPPING CONVEYANCES

This is a divisional of application Ser. No. 08/027,838, filed Mar. 8, 1993, now U.S. Pat. No. 5,662,048.

BACKGROUND OF THE INVENTION

Pallets are used in most industries to facilitate the shipment of their products. Most Pallets are constructed of wood and can be of different dimensions. Though pallets may be reused, in many cases they are not due to costs and other problems. The economies of recycling wood pallets, as presently configured, is marginal at best. There is often a tremendous shipping imbalance between the origination point and the receiving point which causes pallets to accumulate at receiving points. This is particularly true with regard to pallets sent from the suppliers of produce to the grocery industry. In order for the pallets to be reused, they must be redistributed or sent back to their origination point. The cost of return freight, handling and repair relative to the number of units shipped discourages this activity. As a result, the origination point adds new units to the system while units accumulate at the receiving point creating a huge disposal problem. The disposal problem is particularly acute in and around major metropolitan areas where burning may be prohibited due to environmental concerns.

Since wood pallets are constructed with nails or fasteners, the pallets are not easily disassembled for transport back to an origination point. If the wood pallets are shipped without disassembly, they take up a large volume of shipping space. As shipping rates are dependent on volume as well as weight, shipping costs of assembled pallets are much greater than the cost of shipping disassembled pallets. The shipment of assembled wood pallets is so expensive that in most cases, the shipment and reuse of wood pallets is not economically feasible. Additionally, since wood pallets are not particularly durable, they often require repair before they may be reused. One alternative solution is to disassemble the wood pallets and then reassemble them at the origination point. But the cost of reusing wood pallets which have been disassembled and reassembled is even higher than that of reusing pallets which have not been disassembled due to the labor and material costs of disassembly and assembly of the wood pallets. A new pallet which can be easily and economically reused is therefore desired.

A variety of pallet configurations have existed in the prior art. Some have tried to make improved pallet assemblies by improving the fastening method. But these designs are undesirable as they involve the use of a large number of fasteners which must each be manipulated upon both assembly and disassembly. Many prior pallet assemblies do not have solid one piece top and bottom sections, but rather use a number of smaller pieces joined together to form the top and the bottom platform. These may be less sturdy than the pallets with one piece top and bottom platforms, and then often involve more difficult, and hence more costly disassembly and assembly. Many prior art pallets do not maximize the use of identical components such that the components may be interchanged, stacked, and easily replaced. Some pallets are capable of compact storage and shipment yet are not easily assembled and disassembled. What is needed is a pallet with sturdy one piece top and bottom sections, components that may be placed into a more compact configuration for shipment, and that maximizes the use of identical components and may be quickly and economically assembled and disassembled.

There are a number of control methods well known in the art for tracking goods and the shipment of goods. However, these tracking methods generally track the goods rather than the pallet. To identify and track only the pallet units on which the goods rest, results in recycling inefficiencies. What is needed is a method for use of pallets and other shipping conveyances which allows for the efficient use and reuse of pallets and other shipping conveyances.

SUMMARY OF THE INVENTION

To be reusable the pallet should be made of a material which is both economical and durable. Plastic, metal and composites qualify on both counts. Some metals would clear the aforementioned hurdles, but generally their weight and their cost of manufacture is relatively high. Plastic has a low weight per unit volume and a low cost of manufacture. Although many materials may be used, at present, the preferred embodiment of the present invention uses recyclable plastic material. One of the advantages of using recyclable plastic material is that damaged pieces can be "melted down" and refabricated. In addition, as more standardization evolves, obsolete units could be easily and economically refabricated.

The present invention includes several pallet embodiments, each of which may be disassembled for compact storage. The present invention includes accommodation for data collecting devices which provide for easy tracking of pallets. The present invention also provides for easy access in all four directions by a lifting device, normally the tines of a forklift truck, as well as accommodation for use of a pallet jack.

One embodiment of the new pallet, herein referred to as the first embodiment, is readily assembled and disassembled by the manipulation of only five components. The components are first assembled into a hauling configuration. The components are brought together using either tongues and grooves or channels. Two platforms are horizontally located, and are separated by three vertical runners. The runners are inserted into both the top and bottom platforms.

The components are securely held together by interlocking channels. Each of the runners contains a runner flange which engages with a receiver channel located within the opposite platform. The runner flange is locked into position in the receiver channel by snap locks. The receiver snap locks are located near each end of each of the receiver channels on each platform. Corresponding runner snap locks are located on one end of each runner.

The new pallet provides for access in all four directions by a lifting device, normally the tines of a forklift truck. The configuration of platforms and runners creates openings between the runners allowing access by forklift to either end of the pallet. Each of the runners has holes formed therein of a sufficient size so as to enable forklift tines to penetrate the runner. Thus, the pallet may be accessed from either of the other two sides. Once the pallet is placed into the hauling configuration, goods may be placed on the pallet and the pallet and the goods may be shipped to their final shipping point.

After the pallet is used, the pallet can be easily disassembled and placed into a shipping configuration. The shipping configuration is a configuration of the components wherein all components are securely held together in a compacted manner. The Pallet is placed in the shipping configuration by the following steps. First, the runners are disengaged from the platforms. Then each runner is placed on its side within a cavity formed within one or both of the platforms. These cavities will be referred to as platform runner shipping cavities. In the preferred embodiment, each of the runners has a length less than the length of the receiver channels. The runner shipping cavities may have a length less than the length of the overall platform, thereby forming a cavity which securely contains each runner. The second platform is then placed on top of the first platform so as to confine the runners between the two platforms. The platforms are bound together by the use of shipping interlock pins on one platform which mate with corresponding shipping interlock pin receivers on the other platform. The shipping configuration allows all components to be joined together into a unit which has a substantially lower profile than the unit has in its hauling configuration. This lower profile allows more pallets to be included within any given return shipment volume.

In this embodiment, the platform surfaces are identical; thus, any platform may be used as either a top or bottom platform. This allows for easy stacking and assembly. The runner surfaces are also identical, thereby allowing a given runner to be inserted into any receiver channel or any runner shipping cavity.

A second embodiment of the present invention uses hinges, and interlocking channels to connect the runners to the platforms. In this embodiment, as in the first embodiment, the top and bottom platforms are identical. The runners are secured to each platform by means of hinges.

The second embodiment of the pallet is assembled into the hauling position by placing a second platform in a position relative to the first platform which is rotated 180° along an axis parallel to that of the length of the hinges of the first platform. Then the second platform is placed on top of the first platform such that the two platforms are parallel to each other and are separated by the runners. In the preferred method of securing the two platforms, each of the runners is secured in place at its free end by engaging it within a corresponding receiver channel. Note that tongues and grooves could be used, as could a simple channel running the length of the platform having no tongues, grooves or locking mechanism. The use of channels as a locking mechanism typically involves the use of both a runner flange and a receiver channel as shown in the first embodiment. Snap locks are preferably used in an embodiment having runner flanges as a locking mechanism. In the preferred configuration of the second embodiment, one snap lock would be located near each end of each receiver channel and one snap lock would be located near one end of each runner flange. Once the pallet is placed into the hauling configuration, the goods may be shipped to their final shipping point.

After the pallet has been used for shipment of goods, the pallet is disassembled and reassembled into the shipping configuration. First, the top and bottom platforms are separated so as to disengage each runner flange from the corresponding receiver channel. The top and the bottom platforms can then be folded on top of each other. The platforms may then be secured into the shipping configuration by a set of shipping interlock pins and receivers. Since the runners fold parallel to the platforms the height of the pallet is significantly decreased.

A third embodiment of the present invention uses a two-piece configuration in which the top platform is not identical to the bottom platform. In this embodiment, both the top platform and the bottom platform have raised surfaces which contain either runner flanges or receiver channels. The two platforms are joined by engaging corresponding runner flanges on one platform with receiver channels on the opposite platform.

This embodiment also incorporates snap locks to secure the platforms together. Data collection devices are located on the outside edges of each of the end raised surfaces of the top platform. The pallet is placed in the shipping configuration by simply disengaging the top platform from the bottom platform and placing the top platform onto the bottom platform in such a way that a number of the raised surfaces of the top and bottom platforms fit into shipping pockets. The use of shipping pockets allows this configuration to have a reduced height for easy stacking and return shipping. In addition to reducing the height of the pallet in the shipping configuration, the placement of the raised surfaces into shipping pockets acts to secure the two platforms together during shipment.

A fourth embodiment of the current invention uses top and bottom platforms which are identical to the top and bottom platforms of the third embodiment except that the raised surfaces are much shorter in height and each has runner shipping cavities formed within it. Obviously, this embodiment could also be configured so that there are no raised surfaces. The fourth embodiment of the present invention uses runners which have receiver channels on one edge of the runner and runner flanges on the opposite edge of the runner. The pallet is placed into the hauling configuration by inserting each runner flange of each runner into a receiver channel located on one of the platforms. The second platform is then attached by engaging the receiver channel of each runner with the flange located on each raised surface of the second platform. The preferred embodiment of this configuration also uses snap locks to secure the runners in place and data collection devices for identification and tracking.

The fourth embodiment is placed into the shipping configuration in much the same way as the first embodiment. Namely, the runners are disengaged from the platforms and placed within runner shipping cavities. The top platform is then engaged with the bottom platform so as to securely enclose the runners. The platforms then may be locked into the shipping configuration by the use of shipping interlock pins and receivers. The shipping configuration which is thereby formed has a significantly reduced height and is securely fastened together. Please note that since the runners are identical, they may be mated together before they are placed into the runner shipping cavities.

As discussed above, tongues and grooves could be used in any configuration instead of runner flanges and receiver channels. For illustration purposes the fourth embodiment will be illustrated as having tongues and grooves instead of runner flanges and receiver channels.

Each of the embodiments typically may contain data collection devices. The data collection devices will preferably be located near one or more of the four corners of the pallet and/or the ends of the runners. Those configurations which use runners will have data collection devices preferably located on ends of each side of each runner and/or the ends of the runners. Those embodiments not employing runners typically have data collection devices preferably located on the side of both top and bottom platforms. The data collection devices are preferably located within recesses to protect them from contact with other objects.

Preferably, each platform of each embodiment contains weight saving cavities and ventilation holes. By employing proper design techniques, structural strength of the platform is enhanced while using weight saving cavities and ventilation holes.

One of the objects of the invention is to provide a method for using pallets and other shipping conveyances which allows for the efficient use and reuse of pallets and other reusable shipping conveyances. Though this method is described in detail with regard to the tracking of pallets, this method may also be incorporated with any type of reusable shipping conveyance which contains a data collection device.

Data collection devices on each of the reusable pallets will contain identification data, customer data and trip data. Upon receipt of a newly manufactured pallet, the pallet will be assigned a unique, permanent identification code. A customer master data file contained on a computer contains customer specific information, the identification codes of each of the pallets assigned to a customer, and trip information.

Upon receipt of an order from a customer, data regarding that customer and the order will be input into the master data file. The placement location (the location from which customer goods are to be shipped) is stored on the master file as is the pallet delivery date.

At the placement location, the pallets will be assembled into the hauling configuration. Next data is exchanged between the computer and the data collection device. There are any number of methods of transferring data from a computer to a data collection device and from a data collection device to a computer. The method of transfer is obviously dependent on the type of data collection device used. However, for brevity this process will be described only with reference to the use of a remote computer and an erasable programmable read only memory device (EPROM) located on the pallet. Information from the master file will be transferred from the master data file to the remote computer. The information contained on the data collection device of the pallet will be read and stored on the remote computer. The remote computer will then transfer the selected information from the master file to the data collection devices on the pallet. The information which will be placed onto the data collection device includes trip data and customer data.

The supplier will then load goods onto the pallets and ship the goods to the receipt location. When a customer has moved the goods off of the pallet, and when he has no further use for the pallet at the receipt location, he contacts the pallet provider who then picks up the pallet. A remote computer, located at the receiving pallet placement office will then be connected to the pallet. The information on the data collection device is then read and updated. The data on the master data file is also updated.

Standard inventory control methods may then be used to allocate the pallets to particular pallet placement offices which require pallets, and to determine when pallets need to be sent from a receiving pallet placement office to a shipping pallet placement office. When a shipping pallet placement office requires additional pallets, a receiving pallet placement office will place pallets into the hauling configuration and ship them to the shipping pallet placement office. Once the pallets have arrived at the shipping pallet placement office, they may then be reused and the cycle repeated.

DETAILED DESCRIPTION OF THE INVENTION

In the following descriptions, numerous specific details are set forth such as dimensions, specific locations of components and attachment methods, etc. in order to provide a thorough understanding of the present invention. It will be obvious, however, to one skilled in the art that the present invention can be practiced without these specific details. For instance, the components of the present invention are described as being connected by sets of locking channels; but tongues and grooves, as well as a number of various other methods could be used to secure the various components. In other instances, well-known method steps have not been described in detail in order not to unnecessarily obscure the present invention.

Figure 1:
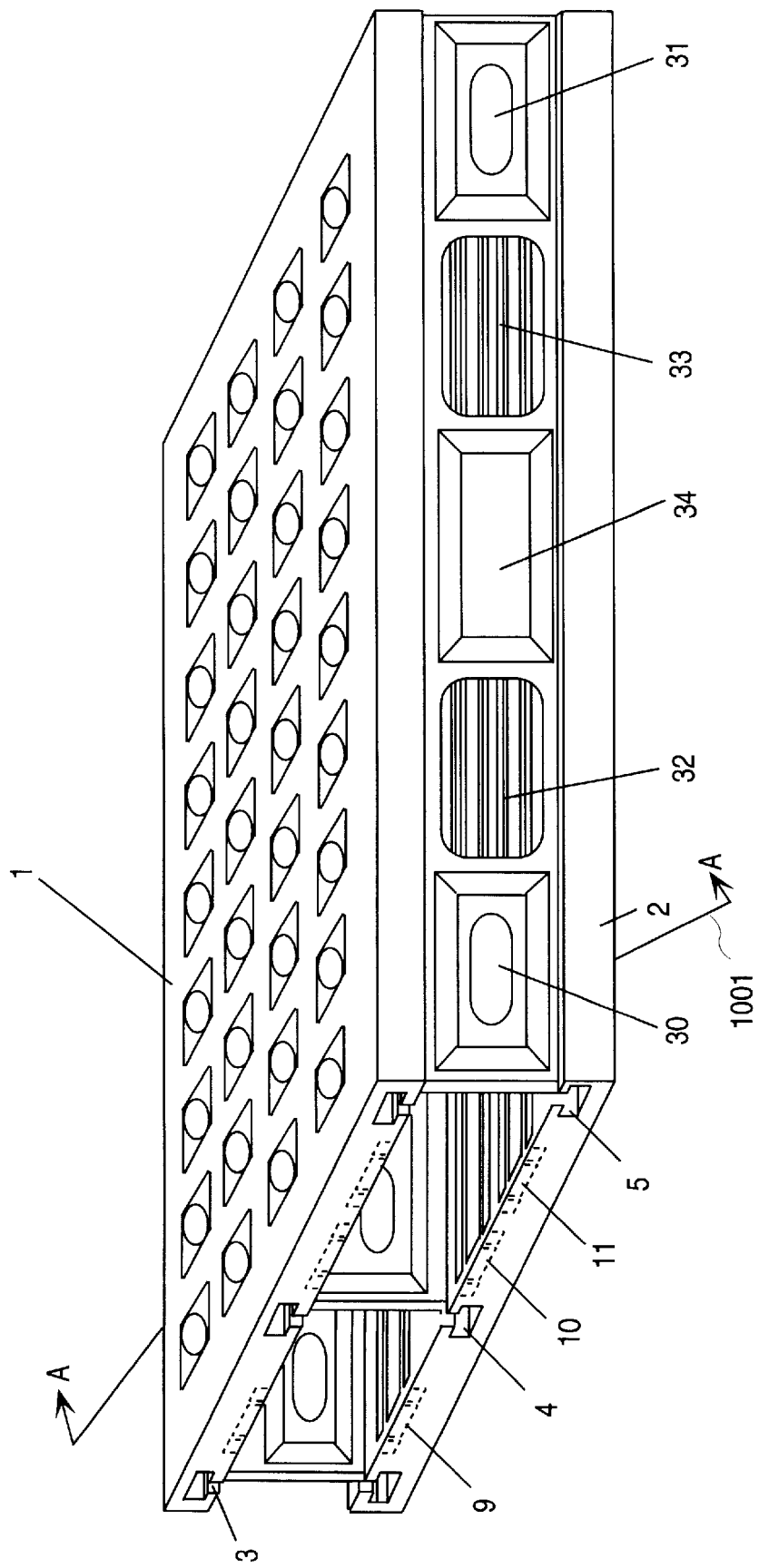
FIG. 1 is a perspective view of the first embodiment of the assembled pallet in the hauling configuration.

FIG. 1 shows a perspective view of the first embodiment of the assembled pallet in the hauling configuration. The top platform 1 is the surface upon which the goods will be placed for shipment. The bottom platform 2 is identical to the top platform 1. This allows for easy interchangeability of parts and simple construction. The top platform 1 is connected to the bottom platform 2 by the use of runners 3, 4 and 5. These runners give support to the structure. Though the preferred embodiment of the present invention shows only three runners, it may be desirable to use a larger number of runners. When heavy loads are to be transported, a larger number of runners may be desirable in order to give the pallet additional structural supporting strength. The height of the runners 3, 4 and 5 must be sufficient so as to allow the tines of a forklift truck to enter between each of the runners, and between the top platform 1 and the bottom platform 2. Each of the runners contain forklift holes 32 and 33 so as to allow forklift access from the sides of the pallet. Both the top platform 1 and the bottom platform 2 contain runner shipping cavities. This diagram shows bottom platform 2 to contain runner shipping cavities 9, 10 and 11. Since the top platform 1 is identical to the bottom platform 2, each runner shipping cavity on the top platform 1 will lie directly above a corresponding runner shipping cavity on the bottom platform 2.

Figure 2:
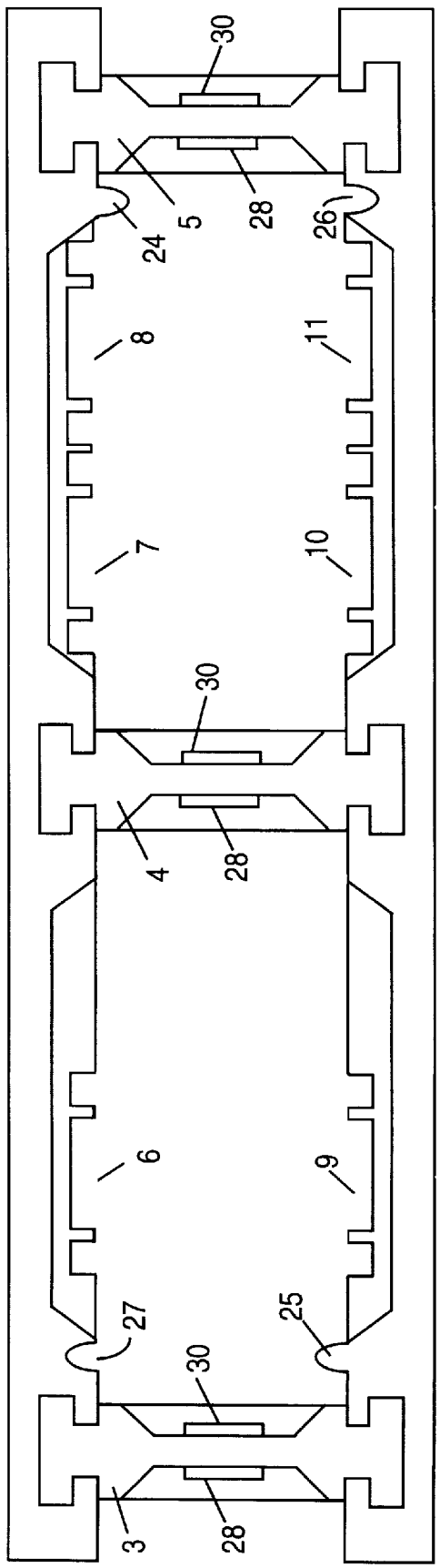
FIG. 2 is a cross sectional view of the first embodiment of the assembled pallet in the hauling configuration along axis A—A.

FIG. 2 shows a cross-sectional view of the first embodiment of the assembled pallet in the hauling configuration. This view shows runners 3, 4 and 5. Runner shipping cavities 6, 7 and 8 are located within the top platform 1 and runner shipping cavities 9, 10 and 11 are located within the bottom platform 2. Since the bottom platform 2 is identical to the top platform 1, each runner shipping cavity located within the top platform 1 will lie directly above a shipping cavity located within the bottom platform. Runner shipping cavity 6 lies directly above runner shipping cavity 9. Runner shipping cavity 7 lies directly above runner shipping cavity 10. Runner shipping cavity 8 lies directly above runner shipping cavity 11. These runner shipping cavities are of a sufficient size so that upon the placement of the top platform 1 directly on top of bottom platform 2, a cavity is created which is large enough to contain each of the runners 3, 4 and 5. As each of the runners 3, 4 and 5 are of an identical size and shape, each of the runner cavities are also of an identical size and shape.

This figure also shows the data collection devices 28 and 30 located on each side of each runner. Not visible in this drawing are data collection devices 29 and 31 which lie on the opposite end of each runner. These data collection devices can be one or some combination of bar codes, magnetic strips, radio frequency identification tags, EPROMS, random access memory devices, or light sensitive devices. Note that the data collection devices are located within cavities for their protection. Shipping interlock pin 24 and 25, and shipping interlock receivers 26 and 27 lock the two platforms together once the pallet is placed into the shipping configuration. When the pallet is placed into the shipping configuration, shipping interlock pin 24 will, for example, fit within shipping interlock receiver 26 and shipping interlock pin 25 will fit within shipping interlock receiver 27. Though the current configuration only shows one pin and one receiver on a given platform, any number of pins and receivers could conceivably be used. These pins and receivers function to secure top platform 1 to bottom platform 2 during shipment when the pallet is in shipping configuration.

Figure 3:
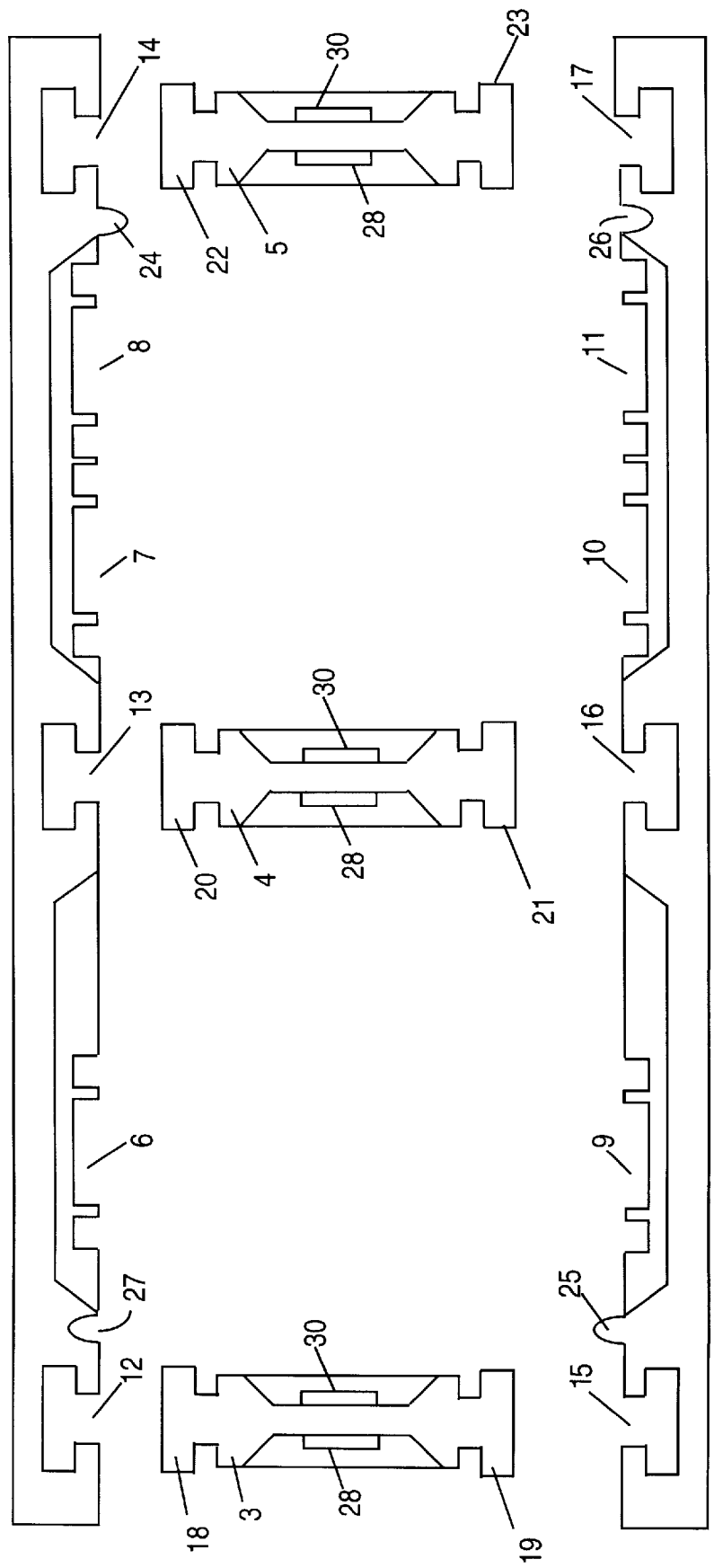
FIG. 3 is an exploded cross sectional view of the first embodiment of the assembled pallet in the hauling configuration along axis A—A.

FIG. 3 shows an exploded cross-sectional view of the embodiment in the hauling configuration. Receiver channels 12, 13 and 14 are located in top platform 1. Corresponding receiver channels 15, 16 and 17 are formed within bottom platform 2. Each runner contains two runner flanges. Runner 3 is shown, for example, to contain runner flanges 18 and 19. To assemble the pallet into the hauling configuration, runner 3 is inserted such that runner flange 18 fits within receiver channel 12 and so that runner flange 19 fits within receiver channel 15. In this manner, runner 3 connects and secures top platform 1 to bottom platform 2. In a like manner, runner 4 is inserted such that runner flange 20 fits within receiver channel 13 and runner flange 21 fits within receiver channel 16. Similarly, runner 5 is inserted such that runner flange 22 fits within receiver channel 14 and runner flange 23 fits within receiver channel 17. Once all runner flanges are inserted, the runners securely attach to the top platform 1 and the bottom platform 2 to form a pallet assembly in the hauling configuration.

Figure 4:
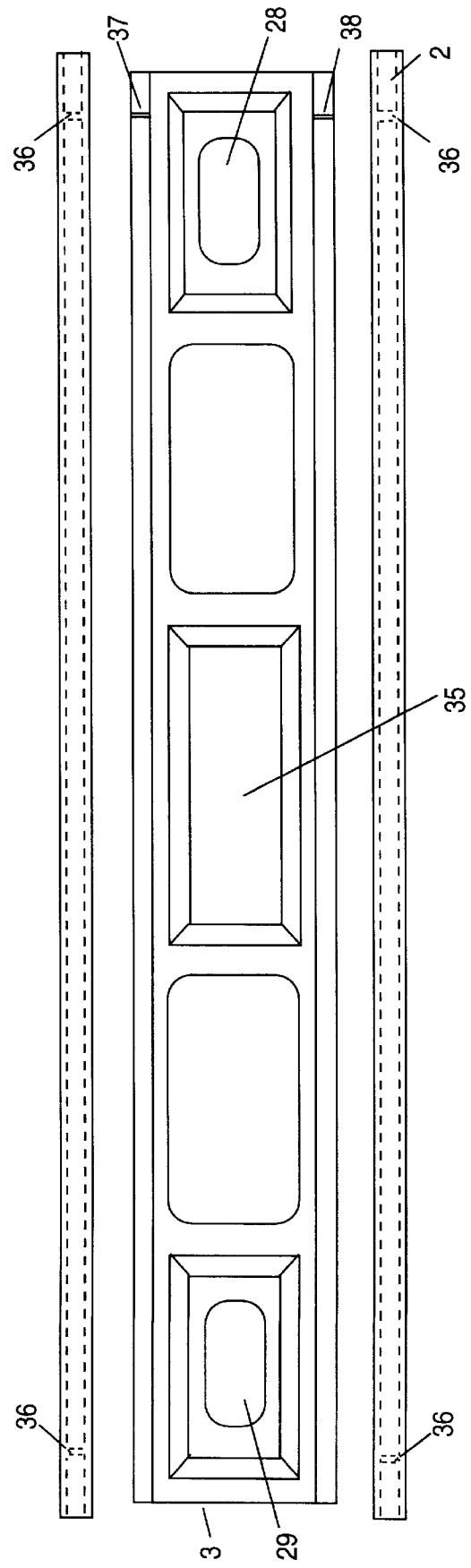
FIG. 4 is an exploded left side view of the first embodiment of the assembled pallet in the hauling configuration.

FIG. 4 shows an exploded left side view of the first embodiment. This view illustrates the recessed cavities which contain data collection devices 28 and 29, and recess cavity 35. Each of the runner flanges 18–23 contains at least one platform snap lock. This runner is shown to have snap locks 37 and 38. The top platform 1 is shown to contain two snap locks 36. Platform 2 contains two identical sets of snap locks 36. When the pallet is assembled into the hauling configuration by inserting the runners 3, 4 and 5 into the receiver channels 12–17 of the top and bottom platforms, a platform snap lock 36 will engage runner snap lock 37 to lock the assembly in place. Similarly, a platform snap lock 36, located on the bottom platform 2, will engage runner snap lock 38 to similarly lock the assembly in place. Weight saving cavity 35 is an indentation in the surface of runner 3 which decreases the amount of material required to make runner 3, as do similar cavities in runners 4 and 5. While reducing weight, proper design techniques also enhance the structure strength of the runner.

Figure 5:
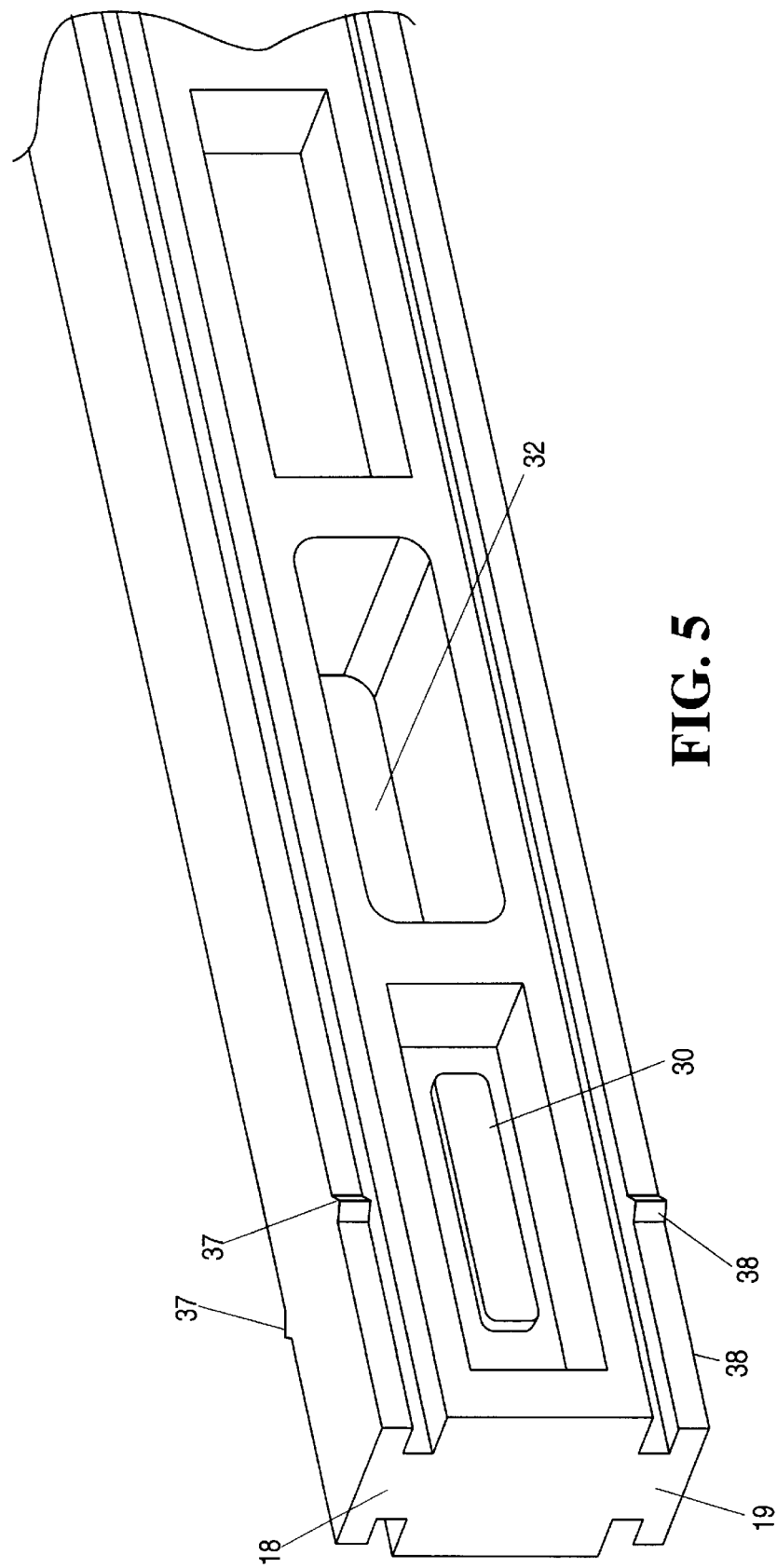
FIG. 5 is a perspective view of a runner of the first embodiment of the pallet.

FIG. 5 is a perspective view of the first embodiment which shows the right hand side of runner 3. Runner flange 18 is formed from two indentations, one located on each side of the flange, and each of which run the entire length of the flange. Runner flange 19, located on the bottom of runner 3 also is formed by locating two indentations on both sides of the runner, that run the length of the runner. A T-shaped protrusion is thus produced on the top and on the bottom edges of the runner. Projections on both sides of the top T-shaped protrusions form runner snap lock 37. Similar projections on both sides of the runner form snap lock 38. Obviously, these snap locks could be located anywhere along the runner surface, and any number of snap locks could be used to secure a particular runner. The T-shape projections, also could be of a variety of shapes. Any shape which would attach a runner securely to the platform would suffice.

Figure 6:
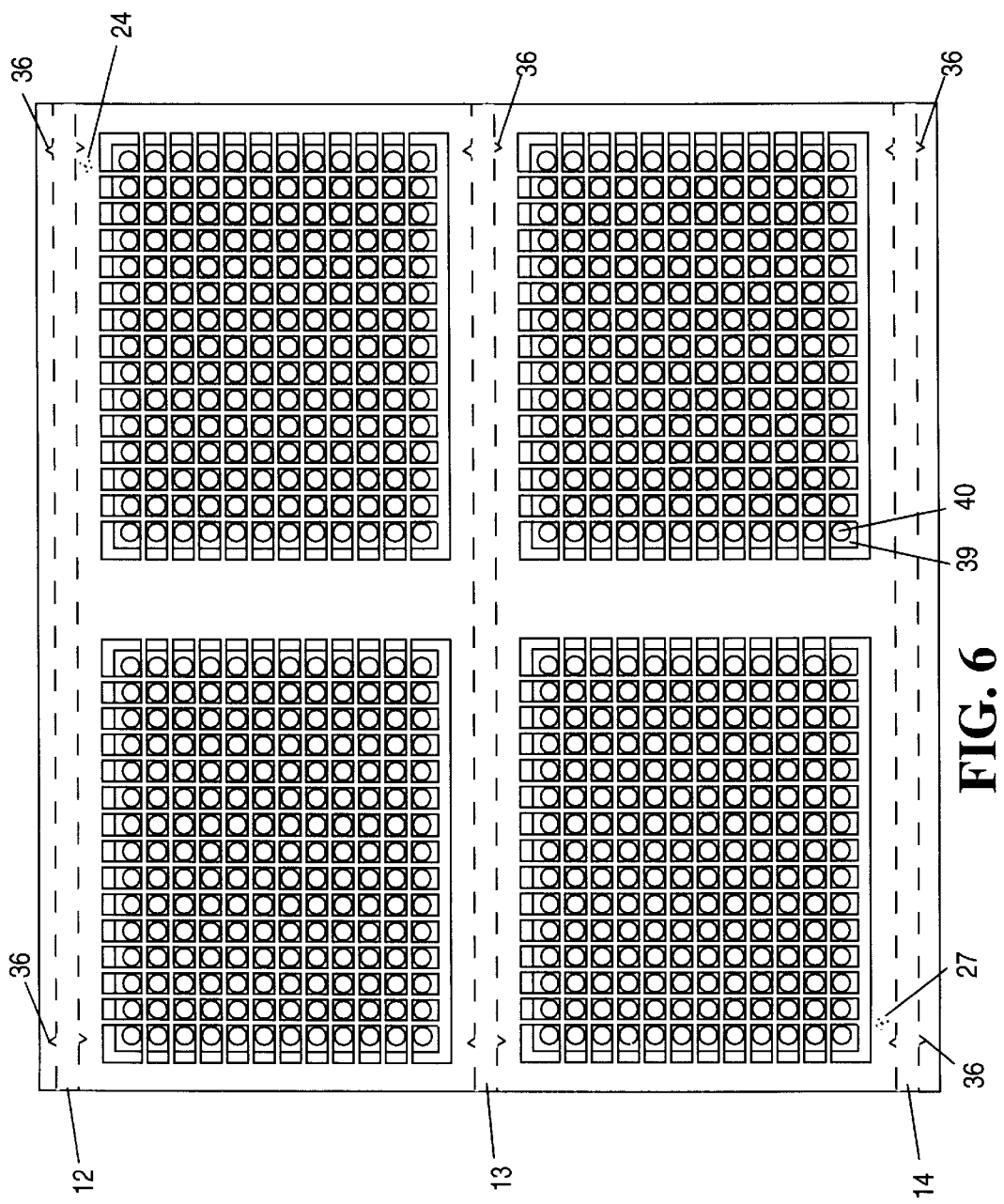
FIG. 6 is a top view of the top platform of the first embodiment of the pallet in the hauling configuration.

FIG. 6 is a top view of the top platform of the first embodiment of the pallet. Receiver channels 12, 13, 14 are shown to run the length of the platform. Each of these receiver channels 12, 13, 14 contain two platform snap lock indentations 36. The top platform 1 contains a number of platform weight saving cavities 39. Each of the weight saving cavities have a surface which is significantly lower than the top surface of the platform. Thus, at the location of each of these platform weight saving cavities, the thickness of the platform is diminished. In the preferred embodiment of the first embodiment of the present invention, a large number of these weight saving cavities are used as shown in the present diagram. As each cavity decreases the thickness of the platform along the surface of that particular cavity, the total volume of material required to make the platform is reduced. Thus, the use of a number of weight saving cavities 39 allows the volume and weight of the platform to be significantly reduced. In the preferred embodiment of the first configuration, ventilation holes 40 are located within each of the weight saving cavities 39. These holes act to reduce the overall volume and weight of the top platform. These holes also allow air to circulate into the interior of the pallet and are self gasketing in certain applications. For example, this can be especially important in the grocery industry where maintenance of fresh produce is dependent on proper air circulation and proper cooling of the load. By employing proper design techniques, the structure and location of the cavities and ventilation holes enhance the overall strength of the platform. Though the volume of the material required to make the platform and the weight of the platform is reduced, the platform is stronger than a similar platform having a solid platform surface.

Figure 7:
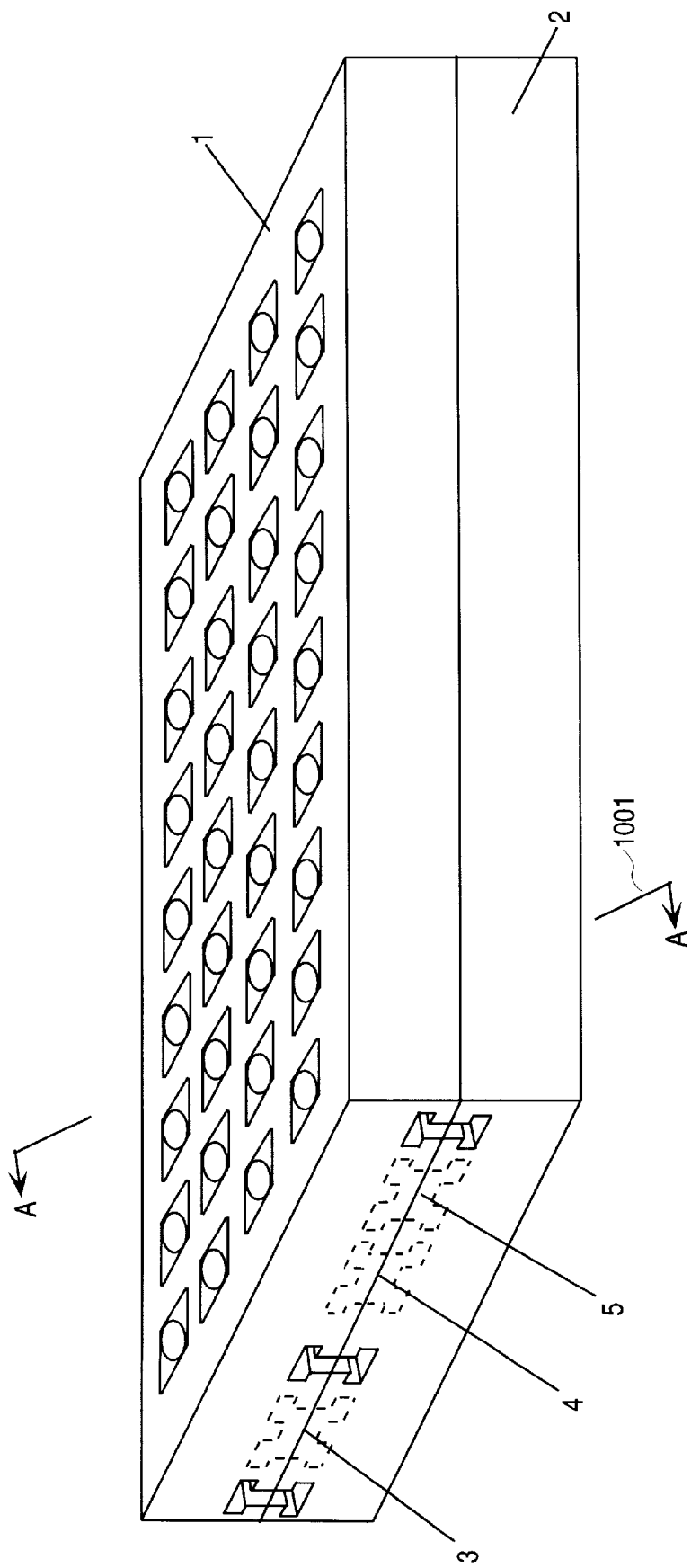
FIG. 7 is a perspective view of the first embodiment of the assembled pallet in the shipping configuration.

FIG. 7 is a perspective view of the first embodiment of the assembled pallet in the shipping configuration. In this configuration, runners 3, 4 and 5 are placed within runner shipping cavities 6–11. Not only does the placement of runners within runner shipping cavities act to secure the runners within the pallet, but also these runners, in addition to the pins, act to secure the top platform to the bottom platform such that the two platforms are securely locked together and so that they will not move relative to each other in a direction parallel to the top and bottom platform surfaces. Note that the overall height of the pallet in this configuration is significantly less than the overall height of the pallet in the hauling configuration.

Figure 8:
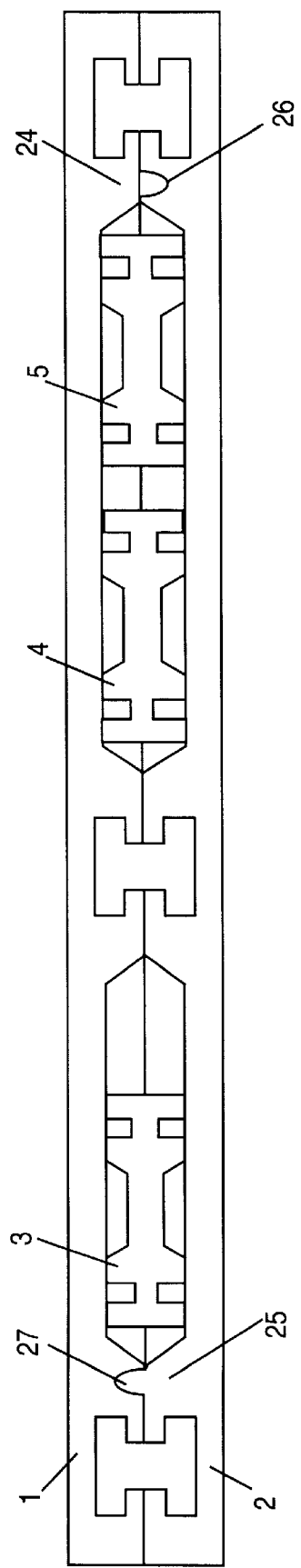
FIG. 8 is a cross-sectional view of the first embodiment of the pallet in the shipping configuration along axis A—A.

FIG. 8 is a cross-sectional view of the first embodiment of the pallet in the shipping configuration along axis A—A. This cross-sectional view clearly shows runners 3, 4, 5 within their corresponding runner shipping cavities. Shipping interlock pin 24 is shown to be inserted within the corresponding shipping interlock receiver 26 on the bottom platform. Shipping interlock pin 25 is shown to be inserted within the corresponding shipping interlock receiver 27 on the bottom platform. This combination of pins and receivers acts to secure the top platform 1 and the bottom platform 2 so as to bind the two platforms securely together when the platforms are placed into the shipping configuration.

Each of the runners 3, 4 and 5 are removed by withdrawing runner flanges 18–23 illustrated in FIG. 3 from receiver channels 12–17. After removing each runner, it is placed within a runner shipping cavity. For example, runner 3 is disengaged from receiver channels 12 and 15 and is placed within receiver shipping cavity 9. In a like manner, runner 4 is disengaged from receiver channels 13 and 16 and place within runner shipping cavity 10, and runner 5 is disengaged from receiver channel 14 and 17 and place within runner shipping channel 11. Then, top platform 1 is placed on top of bottom platform 2 so as to enclose runners 3, 4 and 5. The height of the pallet in FIG. 3 in its shipping configuration is substantially less than its height when it is in the hauling configuration. Each of the platforms 1 and 2 will contain at least one shipping interlock pin, and at least one shipping interlock receiver. Once the pallet is placed into the shipping configuration, shipping interlock pin 24 will fit within shipping interlock receiver 26 and shipping interlock 25 will fit within shipping interlock receiver 27. Though the current configuration only shows one pin and one receiver on a given platform, any number of pins and receivers could conceivably be used. These pins and receivers function to secure top platform 1 to bottom platform 2 during shipment when the pallet is in shipping configuration. The pallet, in its shipping configuration is ready to be shipped back to its original destination, or to some alternate shipping location for reassembly and reuse.

Figure 9:
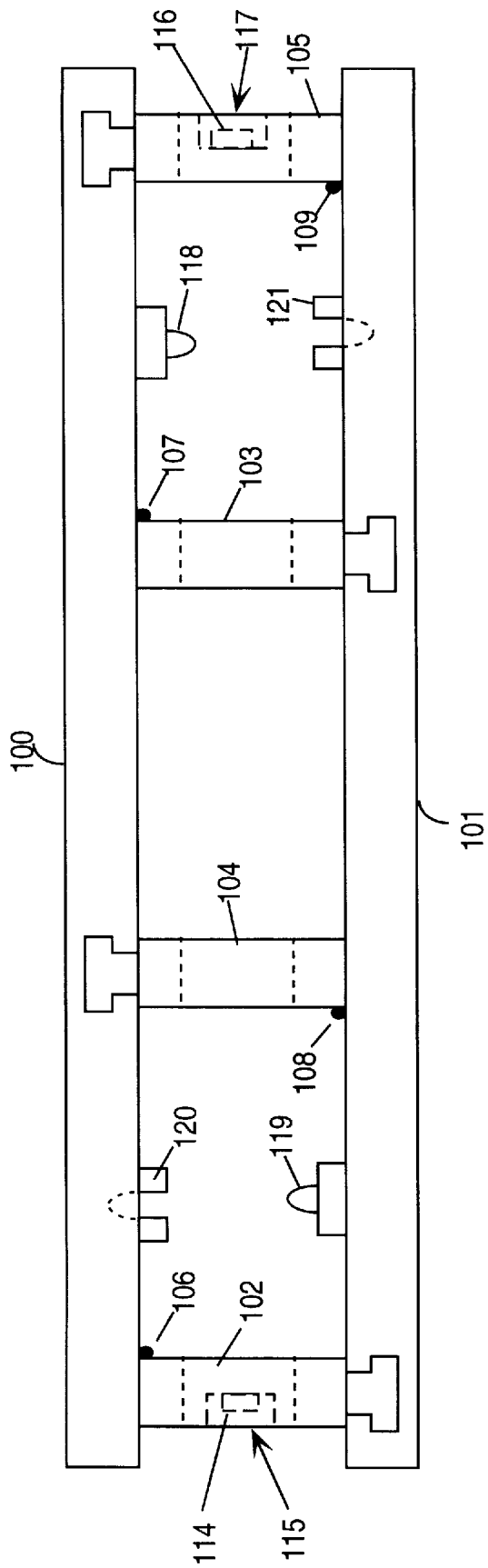
FIG. 9 is an assembled end view of the second embodiment of the pallet in the hauling configuration.
Figure 10:
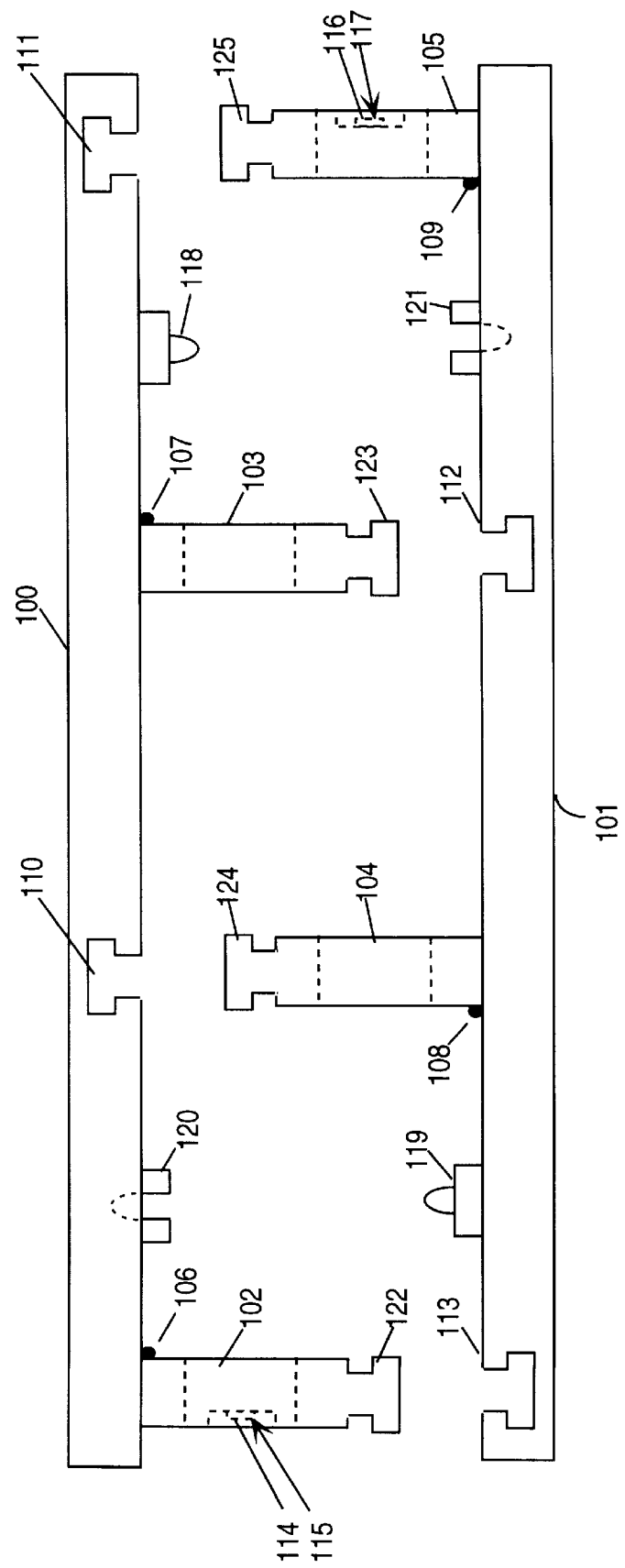
FIG. 10 is an exploded end view of the second embodiment of the pallet in the hauling configuration.

FIGS. 9–12 show a second embodiment of the present invention which may be folded so as to form a shipping configuration. FIG. 9 shows an assembled end view of the second embodiment of the present invention in the hauling configuration. A top platform 100 is shown to which runner 102 and runner 103 are attached. Runner 102 is flexibly attached to top platform 100 by hinge 106 and runner 103 is flexibly attached to top platform 100 by hinge 107. The bottom platform 101 has runners 104 and 105 similarly attached by hinges 108 and 109. Each platform contains a shipping interlock pin 118 and 119 and a corresponding shipping interlock receiver 120 and 121. Please note that top platform 100 with runner 102 and runner 103 attached is identical to bottom platform 101 with runner 104 and runner 105 similarly attached. FIG. 10 shows an exploded end view of the second embodiment. This view illustrates receiver channels 110 and 111 located on top platform 100 and receiver channels 112 and 113 located on bottom platform 101. Corresponding runner flanges are located on the free ends of each of the runners 102–105. Runner 102 is shown to contain channel 122; runner 103 contains runner flange 123; runner 104 contains runner flange 124 and runner 105 contains runner flange 125.

In order to place the second embodiment into the hauling configuration each of the runners is engaged with a receiver channel contained on the opposite runner platform. For example, runner 102 is engaged with the bottom platform by engaging runner flange 122 into receiver channel 113. Similarly, runner 103 is attached by engaging runner flange 123 with receiver channel 112. Runner 104 is attached by engaging runner flange 124 with receiver channel 110. Runner 105 is attached by engaging runner flange 125 with receiver channel 111. These runner flanges act to secure the top platform 100 to the bottom platform 101.

Figure 11:
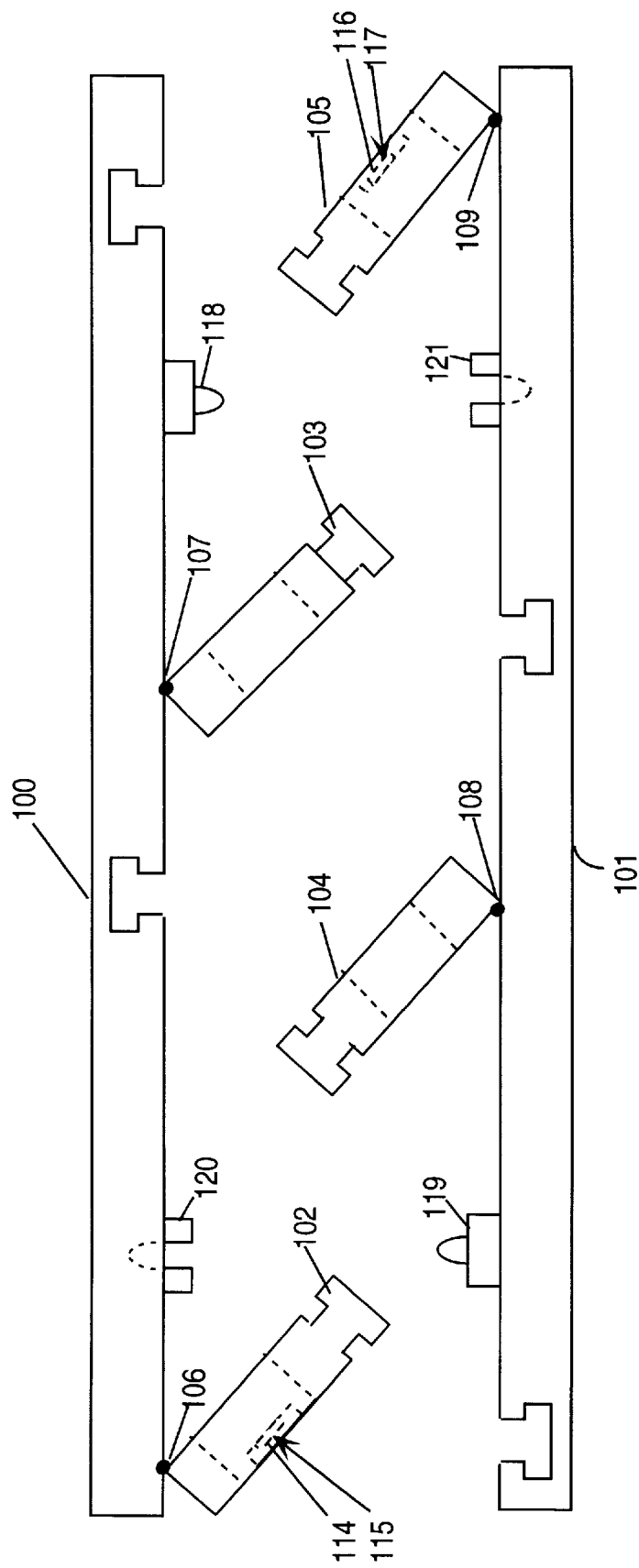
FIG. 11 is a partially folded exploded end view of the second embodiment of the pallet.

Each of the exterior runners contains data collection devices identical to those shown in the first embodiment. For example, runner 102 contains data collection devices 114 and 115 located on the side of each end of the runner. Similarly, runner 105 has data collection devices 116 and 117 located on the side of each end of the runner. FIG. 11 is an end view of the second embodiment. This view illustrates how the folding embodiment is easily transformed from a hauling configuration into the shipping configuration. First, the two platforms are separated by moving platform 100 relative to platform 101 such that each of the receiver channels is disengaged from the corresponding runner flange. Once the two platforms and the corresponding runners are disengaged from each other, each of the runners is folded as shown in the figures. Runner 102 is moved inward such that the side of the runner lies flush to the side of the platform 100. Runner 103 is also moved such that it lies flush to, and in a plain parallel platform 100. Similarly, runners 104 and 105 are moved such that they lie flush, and in a plane parallel to that of the surface of platform 101. Then platform 100 is placed directly on top of platform 101. Since shipping interlock pin 118 is located directly above shipping interlock receiver 121, shipping interlock pin 118 will engage with shipping interlock receiver 121. Similarly, shipping interlock pin 119 lies directly opposite shipping interlock receiver 120. Thus, it will also lockingly engage with shipping interlock receiver 120. This combination of shipping interlock pins 118, 119 and shipping interlock receivers 120, 121 acts to securely fasten the two platforms 100, 101 together into the hauling configuration. Though this configuration shows two shipping interlock pins and two shipping interlock receivers, any number of shipping interlock pins and corresponding shipping interlock receivers could be used.

Figure 12:
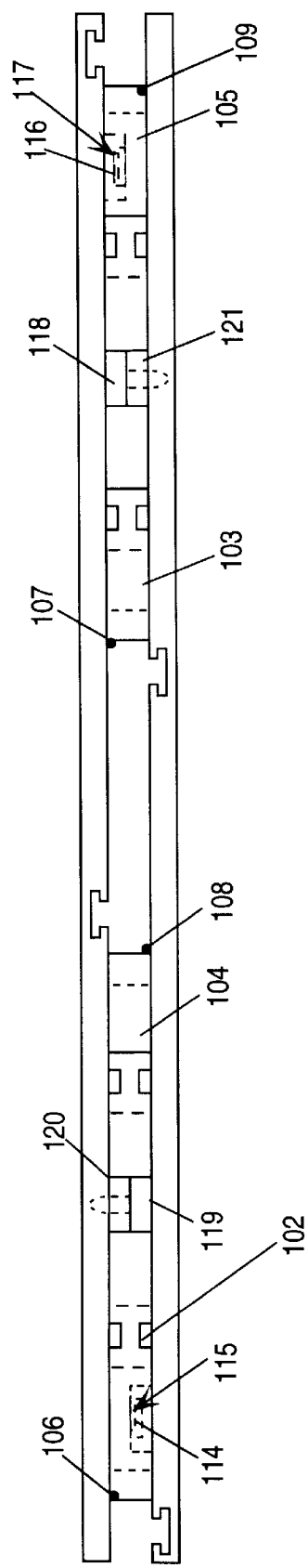
FIG. 12 is an end view of the second embodiment of the pallet in the shipping configuration.

FIG. 12 shows the second embodiment in the shipping configuration. In this configuration, shipping interlock pin 119 will fit within shipping interlock receiver 120 and shipping interlock pin 118 will fit within shipping interlock receiver 121. These shipping interlock pins and the corresponding shipping interlock receivers act to lock the pallet into the shipping configuration. Note that the height of the pallet in the shipping configuration is much less than the height of the pallet in the hauling configuration. Note also that the two platforms could also contain shipping cavities similar to those shown in the first embodiment of the present invention so as to further reduce the height of the pallet in the shipping configuration.

The preferred configuration of the second embodiment also contains runner snap locks and receiver snap locks which are identical to the runner snap locks and receiver snap locks shown in the first embodiment. For the sake of brevity, these components are not shown in the diagrams of the second embodiment. Also not shown on the second embodiment are the platform weight saving cavities and ventilation holes, which may be located on platforms and runners in a manner similar to the location as shown in the first embodiment.

Figure 13:
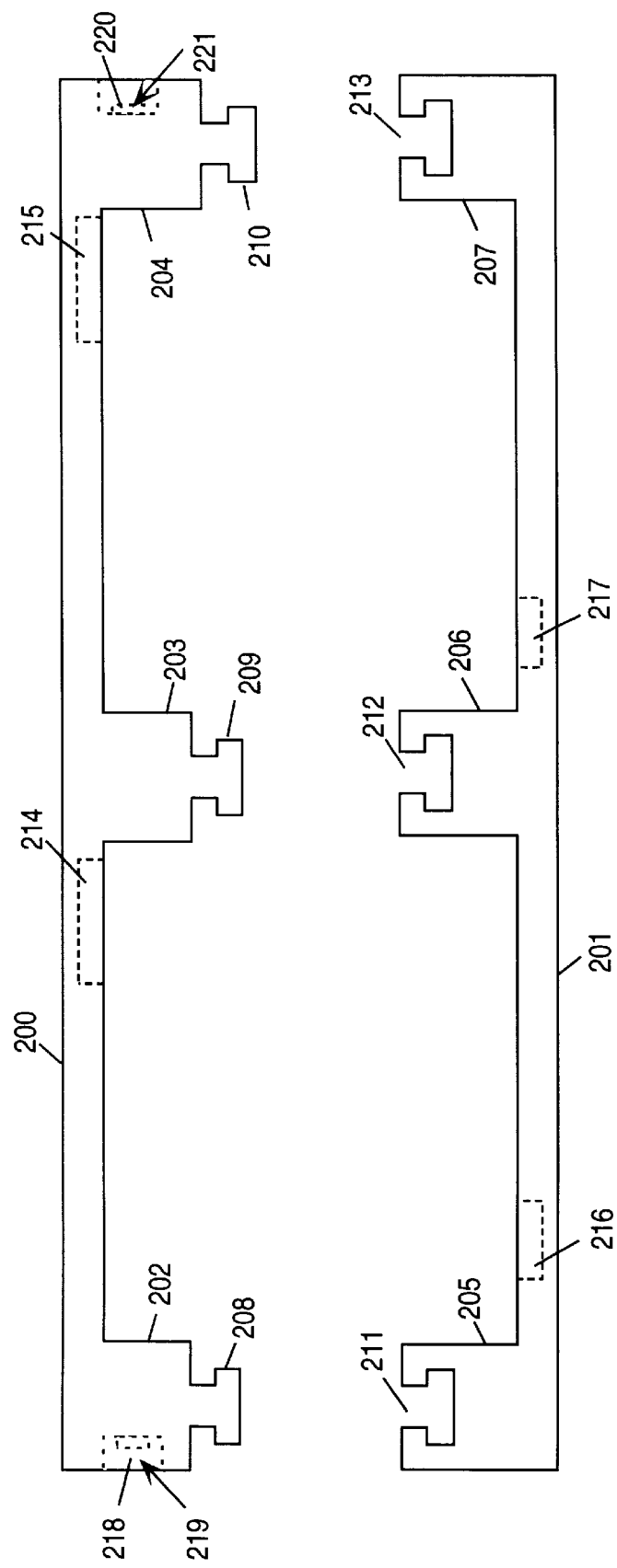
FIG. 13 is an exploded end view of the third embodiment of the pallet.

FIGS. 13–16 show the third embodiment of the current invention. FIG. 13 shows an exploded end view of this embodiment. Top platform 200 is shown to contain raised surfaces 202, 203 and 204. On the ends of each of these raised surfaces is a runner flange. FIG. 13 shows runner flange 208 located on the end of raised surface 202; runner flange 209 located on the end of raised surface 203, and runner flange 210 located on the end of raised surface 204. Top platform 200 also contains shipping pocket 214 and shipping pocket 215. In this embodiment of the current invention, the bottom platform 201 is not identical to the top platform 200. The bottom platform contains raised surface 205, 206 and 207 which are located so as to correspond with raised surfaces 202, 203 and 204 on top platform 200. Each of the raised surfaces have receiver channels formed at their ends. Receiver channel 211 is located on the end of raised surface 205. Runner channel 212 is located on the end of raised surface 206. Runner channel 213 is located on the end of raised surface 207. The bottom platform contains shipping pocket 216 and 217.

This embodiment of the pallet is placed into the hauling configuration by engaging each of the runner flanges on the top platform 200 with each of the receiver channels on the bottom platform 201. Thus engaged, runner flange 208 will fit within receiver channel 211. Runner channel 209 will fit within receiver channel 212. Similarly, runner flange 210 will fit within receiver channel 213. The engagement of each of the runner flanges within each of the receiver channels acts to lock the two platforms together. Platform snap locks are located within each of the receiver channels, and within each of the runner flanges to lock the two platforms in place.

Figure 14:
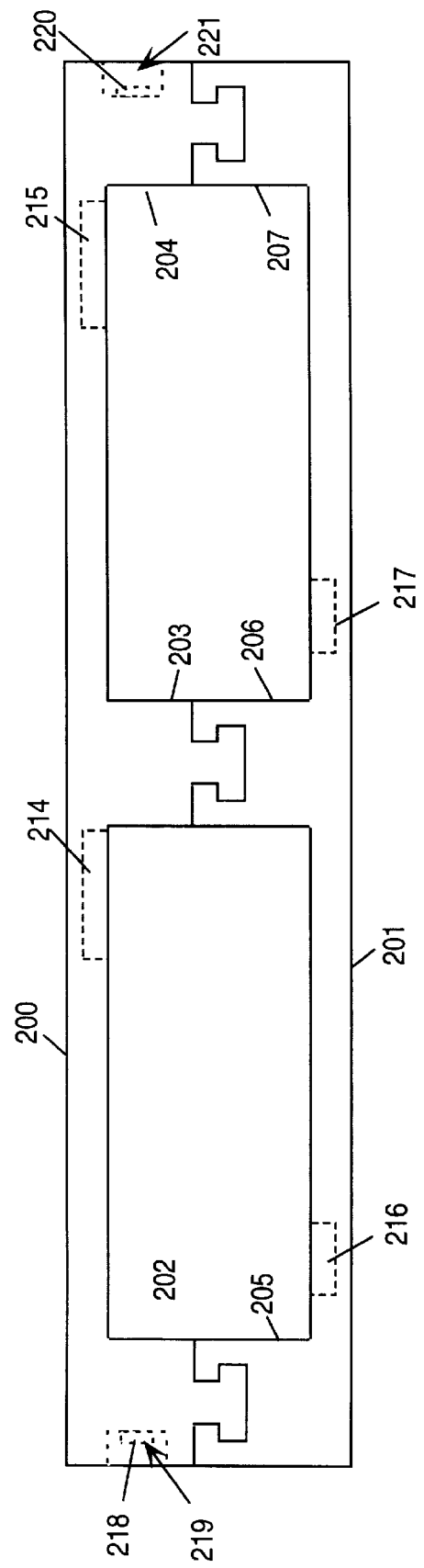
FIG. 14 is an assembled end view of the third embodiment of the pallet in the hauling configuration.

FIG. 14 shows the two-piece embodiment assembled into the hauling configuration. Data collection device are located on each side of the four corners of the pallet. Data collection devices 218 and 219 are located near each end of raised surface 202 and data collection devices 220 and 221 are located near each end of raised surface 204. Note that these data collection devices could also have been placed at raised surfaces 205 and 207. For the sake of brevity, all of the views displaying the data collection devices are not shown on this embodiment.

Figure 15:
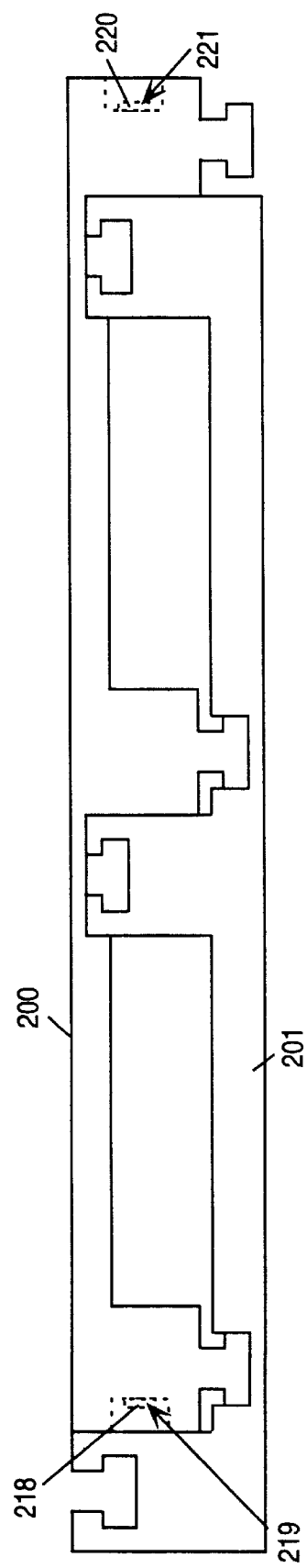
FIG. 15 is a cross-sectional end view of the third embodiment of the pallet in the shipping configuration.

In order to move the pallet from the hauling configuration into the shipping configuration, each runner flange is simply disengaged from the corresponding receiver channel. Thereby top platform 200 is separated from bottom platform 201. The platforms are then placed on top of each other in the manner shown in FIG. 15. Runner flange 208 fits within runner shipping pocket 216 and runner flange 209 will fit within runner shipping pocket 217. Similarly, receiver channel 212 will fit within shipping pocket 214 and receiver channel 213 will fit within shipping pocket 215. FIG. 15 shows the third embodiment of the pallet placed into the shipping configuration. The placement of receiver channels and runner flanges within shipping pockets acts to lock the top platform 100 together with the bottom platform 101. Furthermore, the placement of receiver channels and runner flanges within shipping pockets reduces the height of the pallet to a height less than its height in the hauling configuration and less than the height of an assembly having no shipping pockets.

Figure 16:
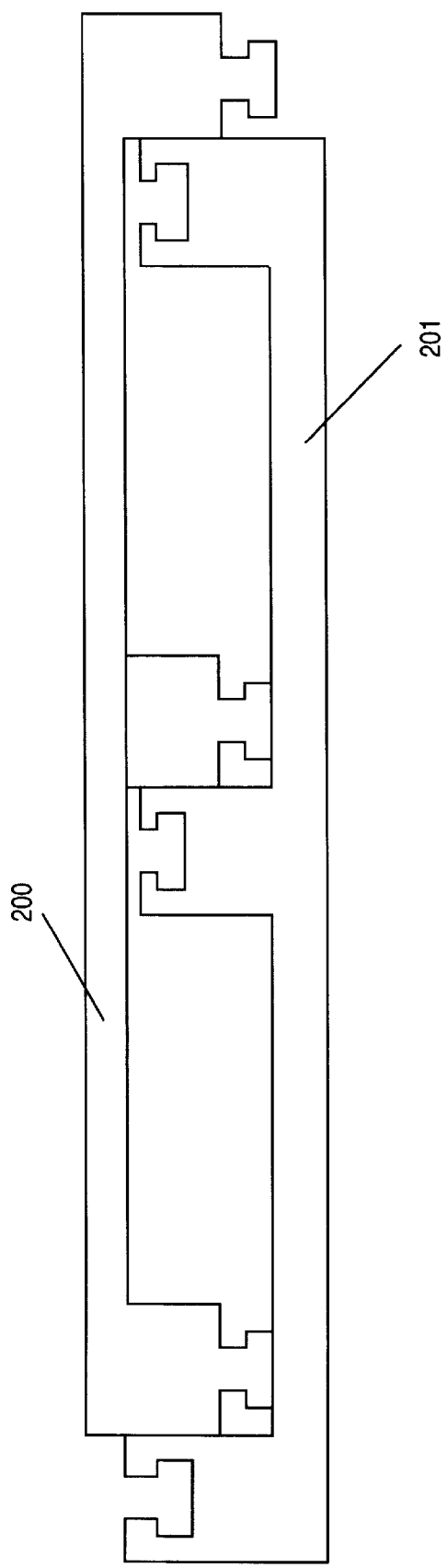
FIG. 16 is an end view of a similar two-piece embodiment of the pallet without runner shipping cavities.

FIG. 16 illustrates the overall height of a similar assembly without shipping pockets. Please note that the overall height of the present invention (FIG. 15) is less than the height of the simple stacked configuration shown in FIG. 16.

The preferred configuration of the third embodiment contains runner snap locks and receiver snap locks which are identical to the runner snap locks and receiver snap locks shown in the first embodiment. For the sake of brevity, these components are not shown in the diagrams of the third embodiment. Also not shown on the third embodiment are the platform weight saving cavities, which may be located on each platform in a manner similar to the location in the first embodiment. Each of these platform weight saving cavities may also contain ventilation holes, as shown in the first embodiment. Similarly, each of the runners in the third embodiment may contain weight saving cavities similar to the weight saving cavities 34 and 35 shown in the first embodiment.

Figure 17:
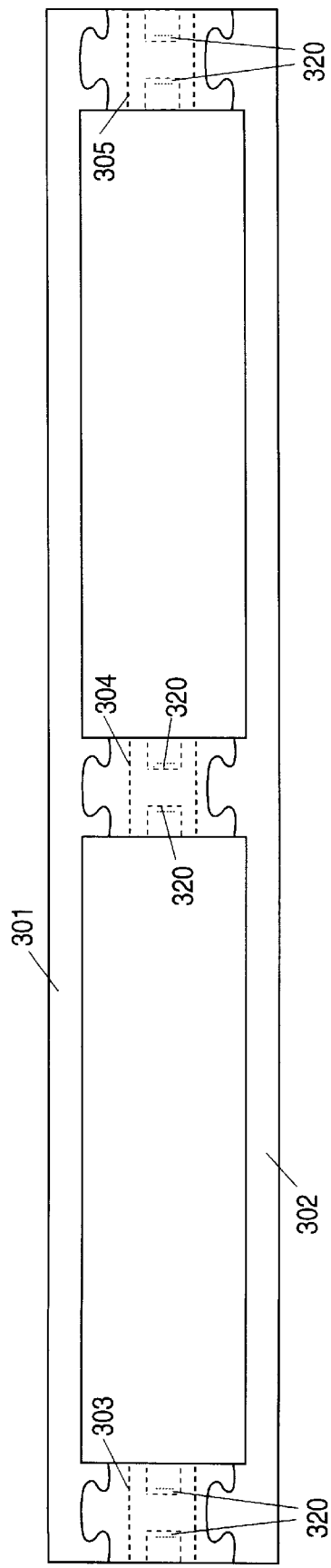
FIG. 17 is an end view of the fourth embodiment of the assembled pallet in the hauling configuration.

FIG. 17 is an end view of the fourth embodiment of the present invention in the hauling configuration. The fourth embodiment of the present invention is similar to the third embodiment in that the top platform is not identical to the bottom platform. This embodiment also contains data collection devices 320 which are shown in this figure. These data collection devices are located in the same manner as that shown in the first embodiment of the present invention. For the sake of brevity, all views showing data collection devices are not shown. Also located in a manner identical to that of the first embodiment of the present invention are platform weight saving cavities and ventilation holes. Any number of these platform weight saving cavities and ventilation holes may be located on any given platform or runner.

Figure 18:
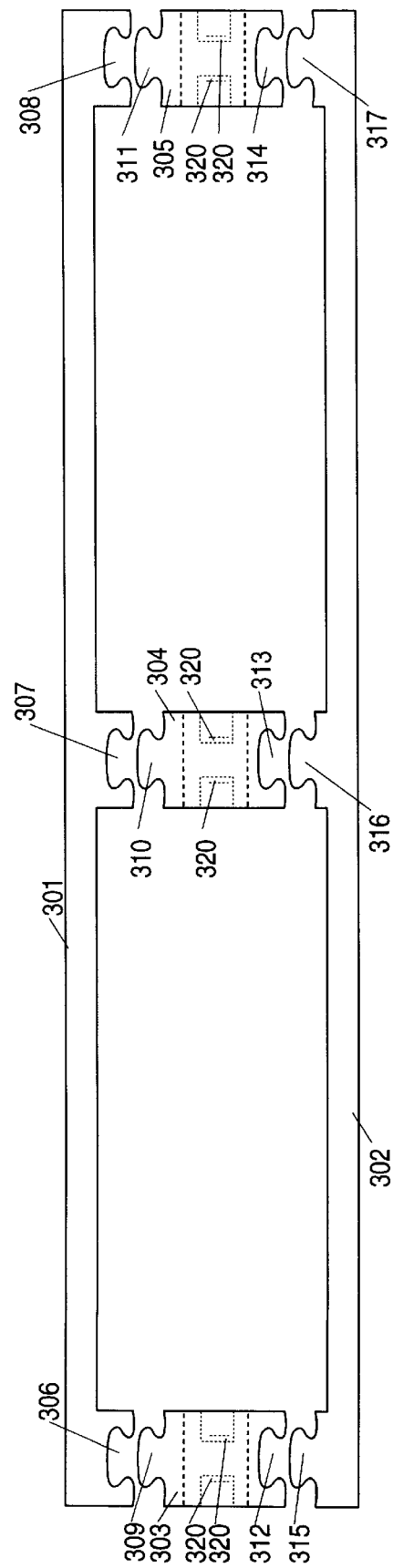
FIG. 18 is an exploded end view of the fourth embodiment of the present invention in the hauling configuration.

FIG. 18 shows the top platform 301 to contain grooves 306, 307 and 308. Each of the runners contains a knob at one edge of the runner and a groove on the other edge of the runner. For example, runner 303 contains knob 309 and groove 312. Runner 304 contains knob 310 and groove 313. Runner 305 contains knob 311 and groove 314. The bottom platform 302 contains knobs formed therein which corresponds to, and are located directly across from corresponding grooves on platform 301. Platform 302 contains knobs 315, 316 and 317.

This platform is assembled in the hauling configuration in much the same way as the first embodiment is placed into the hauling configuration. First, each of the runners is attached to the top platform by engaging each knob with a corresponding groove. For instance, runner 303 would be attached by engaging knob 309 with groove 306, and runner 304 would be attached by engaging knob 310 with groove 307. Runner 305 would be attached by engaging knob 311 with groove 308. Platform 302 is then attached by engaging knob 315 with groove 312, and knob 316 with groove 313, and knob 317 with groove 314.

Figure 19:
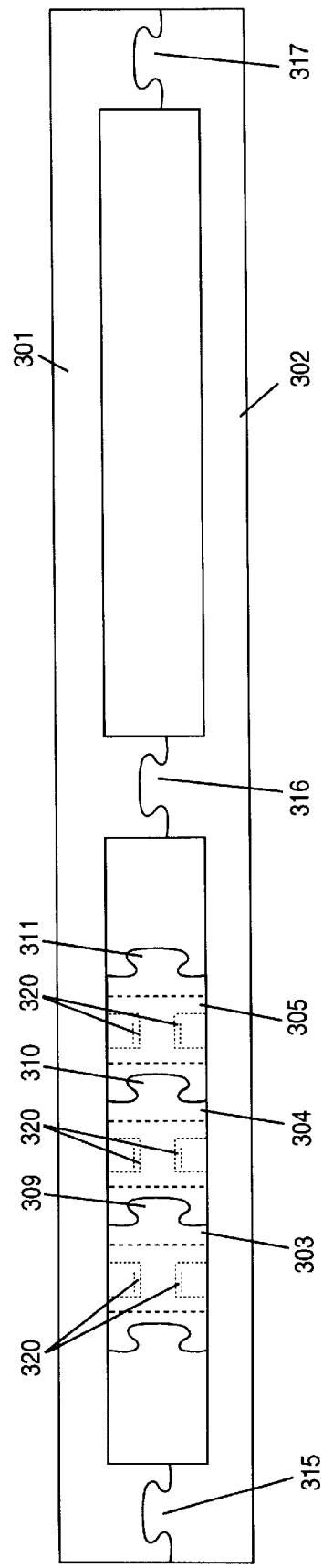
FIG. 19 is an end view of the fourth embodiment of the present invention in the shipping configuration.

The fourth embodiment may be placed into the shipping configuration in a similar manner as the method described in the first embodiment. First, each of the runners is removed by disengaging it from both the top platform 301 and the bottom platform 302. Then, each of the runners may be joined with the other runners in the manner shown in FIG. 19. This may be done, for example, by engaging the knob 309 of runner 303 with the groove 313 of runner 304, and then joining the knob 310 of runner 304 with the groove 314 of runner 305. This acts to lock the runners together securely. FIG. 19 shows the fourth embodiment placed into the shipping configuration. The advantage of this configuration over the prior embodiments is that this configuration locks top platform 301 together with bottom platform 302 in a very secure manner. This is done by engaging each of the knobs on the bottom platform with each of the grooves located in the top platform. Knobs 315, 316 and 317 are engaged with grooves 306, 307 and 308 so as to lock the two platforms together. This creates a very stable pallet assembly for shipment. In this figure, the runners are not shown to be located within individual runner shipping cavities, or even a large runner shipping cavity capable of holding all of the runners joined together, but these runners could be located within runner shipping cavities either similar to those shown in the first embodiment, or one capable of holding the joined runners. A disadvantage of this configuration, however, is the fact that the top platform 301 is not identical to the bottom platform 302.

Due to the tough abuse which a pallet may take in the loading, unloading and moving of goods, it may be desirable to use a pallet having a structure which is stronger relative to forces acting in a plane parallel to that of the runner.

Figure 20:
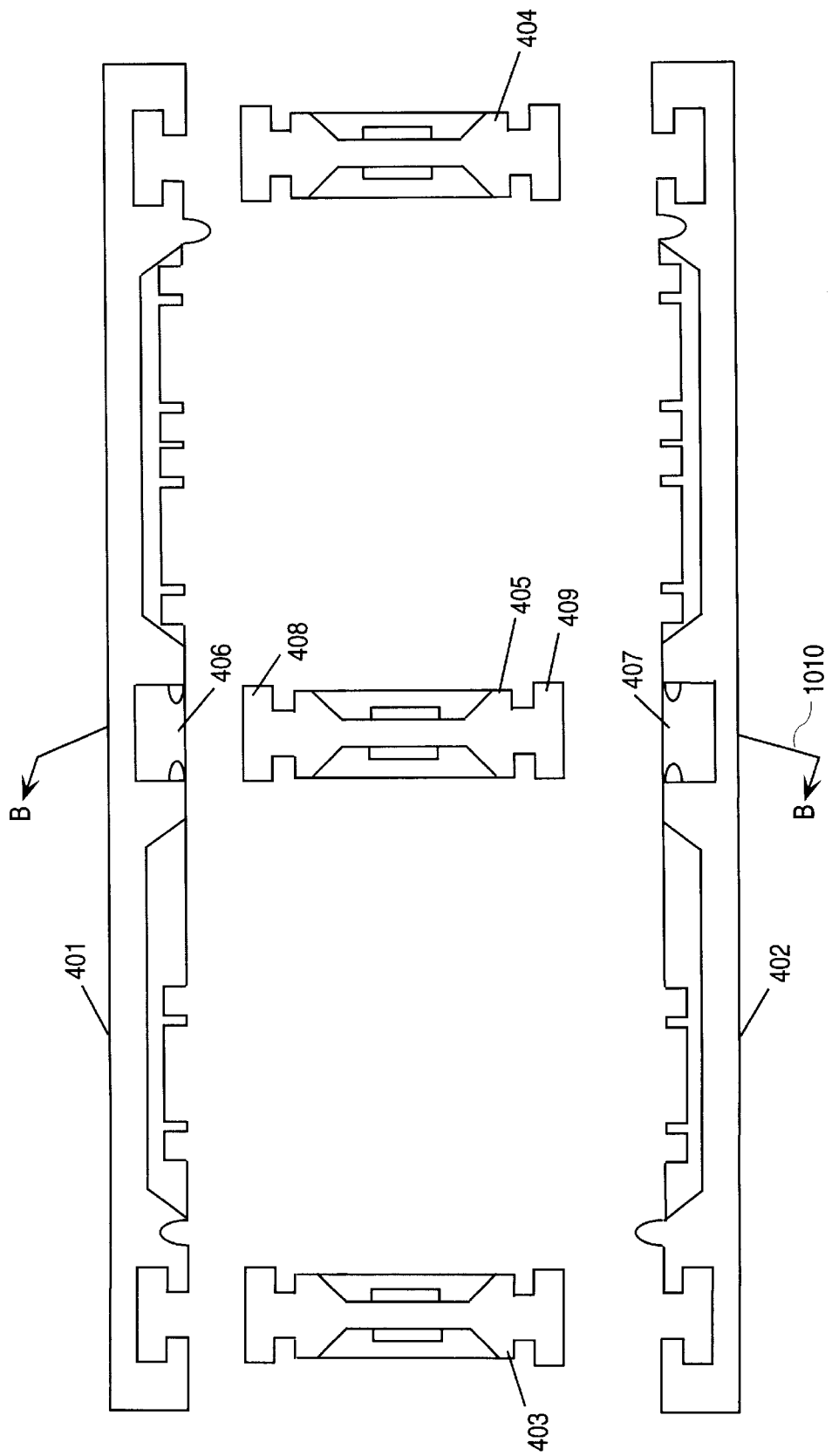
FIG. 20 is an exploded cross sectional view of an assembled pallet having a center stabilization runner in the hauling configuration.

One such structure is shown in FIG. 20. FIG. 20 is a cross-sectional view of the pallet along an axis perpendicular to the direction of the length of the runners. This view shows top platform 401 which is identical to the top platform of the first embodiment except that the center receiver channel of the first embodiment has been replaced by runner support cavity 406. The runner support cavity 406 is of a sufficient size so as to contain and support the runner 405. The bottom platform 402 contains runner support cavity 407, which is identical to runner support cavity 406 located within the top platform. The runner as shown in this diagram is identical to the runners 403 and 404. This central runner could be formed without runner flanges 408 and 409. Such a runner would be roughly rectangular in shape. This shape would allow the runner to fit more tightly and securely within runner support cavities 406 and 407.

Figure 21:
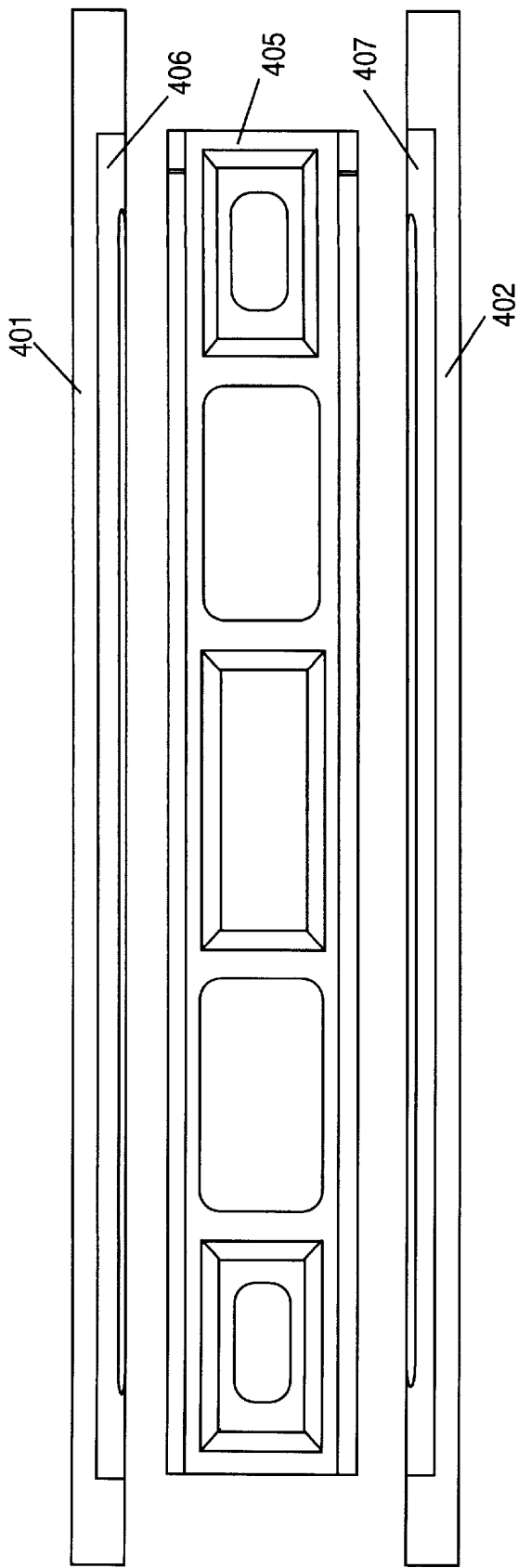
FIG. 21 is an exploded left side view of the first embodiment of the assembled pallet in the hauling configuration along axis B—B.

FIG. 21 shows a cross-sectional view of the pallet along a central axis B—B. This view shows how runner 405 fits within runner support cavities 406 and 407. Note that the runner support cavity is enclosed at both ends such that the runner is not free to slide in a horizontal direction. This acts to securely hold the platform together upon the application of a force to the front or rear of the runner. Rough handling by a fork lift could generate such a force.

Some users of pallets use pallet jacks for moving pallets. Pallet jacks have wheels which are inserted between the top and bottom platforms and which extend through openings in the bottom platform. In order to be able to use a pallet jack in any particular pallet, holes must be formed in the pallet of a sufficient size so as to permit the wheels of the pallet jack to protrude from the bottom platform.

The pallet of the present invention as described in any of the previous embodiments may contain openings located so as to allow the use of a standard pallet jack.

Figure 22:
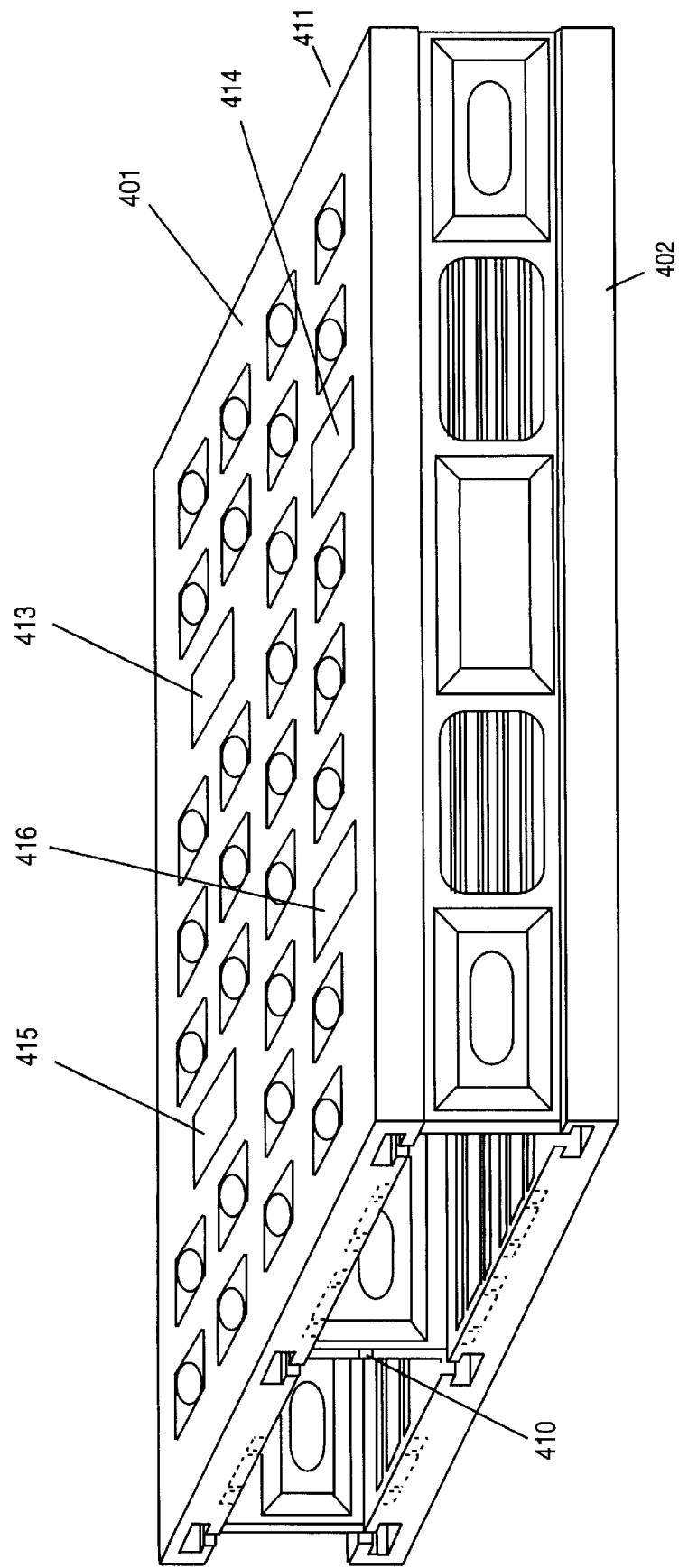
FIG. 22 is a perspective view of an assembled pallet having jack wheel openings in the hauling configuration.

FIG. 22 shows a pallet having openings for the use of a pallet jack. Jack wheel openings 413, 414, 415 and 416 are formed within top platform 401. Identical jack wheel openings are formed within bottom platform 402. Jack wheel openings are preferably formed in both top and bottom platforms so that the platforms remain interchangeable and identical. In those configurations wherein top and bottom platforms are not identical, jack wheel openings may be formed only in the bottom platform. FIG. 22 also shows data collection devices 410 and 411, which are placed at the ends of the runners. For purposes of brevity they are shown only on the middle runner though they could be placed on the ends of any or all of the runners. These additional data collection devices may be placed on the pallet for the purpose of allowing the customer to collect and receive his own data. FIG. 22 shows customer data collection devices 410 and 411 placed on the pallet. This customer data may likely include the type of goods located.

Method for Using Shipping Conveyances

Figure 23:
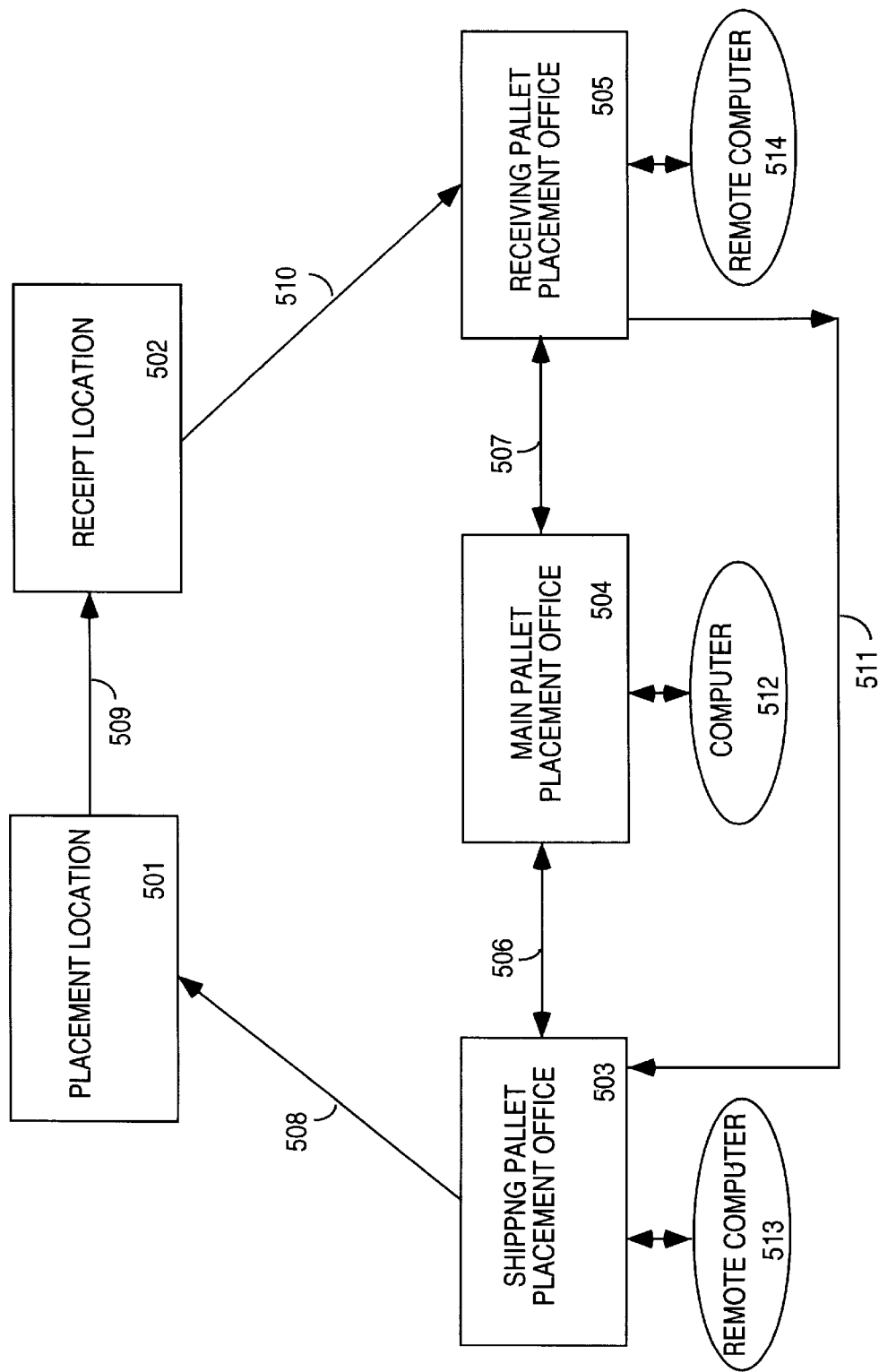
FIG. 23 illustrates the method for using shipping conveyances.

FIG. 23 illustrates the different locations and structures of the present method. For the sake of simplicity, the current invention is described with reference to the following persons and locations:

The customer—the designation of a customer indicates any individual who would require the use of a pallet for the purpose of shipping goods from one destination to a second destination;

Placement location 501—the placement location designates the place from which the goods are to be shipped. The goods will be placed on the pallet at this point and the pallet and the goods will be transferred to the customer receipt location;

Receipt location 502—the receipt location designates the point at which the customer has designated that their goods are to be received and inventoried.

Main Pallet Placement office 504—the pallet provider's main office is designated as a central location for the processing of data and billing. This main office contains a main computer which contains a computer program. This computer program contains a customer master file which includes basic customer data.

Remote computers 513 and 514—either stand alone computers or a system for transferring data to and from a pallet and transferring that data to and from the main computer. Though this method is described with reference to specific locations and systems, there are a number of ways to practice the method as claimed. For example, instead of a main office and a main computer housing the master data file, this office and computer could be eliminated by using remote computers, each containing master data file information. These remote computers could be updated by communication links between the different remote computers. Also, direct links could be established with one central computer, eliminating the need for remote computers.

The physical movement of pallets from the shipping pallet placement office 503 to the placement location 501 is indicated by arrow 508. The pallet upon which goods are loaded then moves to the receipt location 502 as indicated by arrow 509. Once the goods are removed from the pallet, the pallet is transported to the receiving pallet placement office 505 as indicated by arrow 510. The pallet may then be shipped to the shipping pallet placement office as indicated by arrow 511 for reuse.

Figure 24:
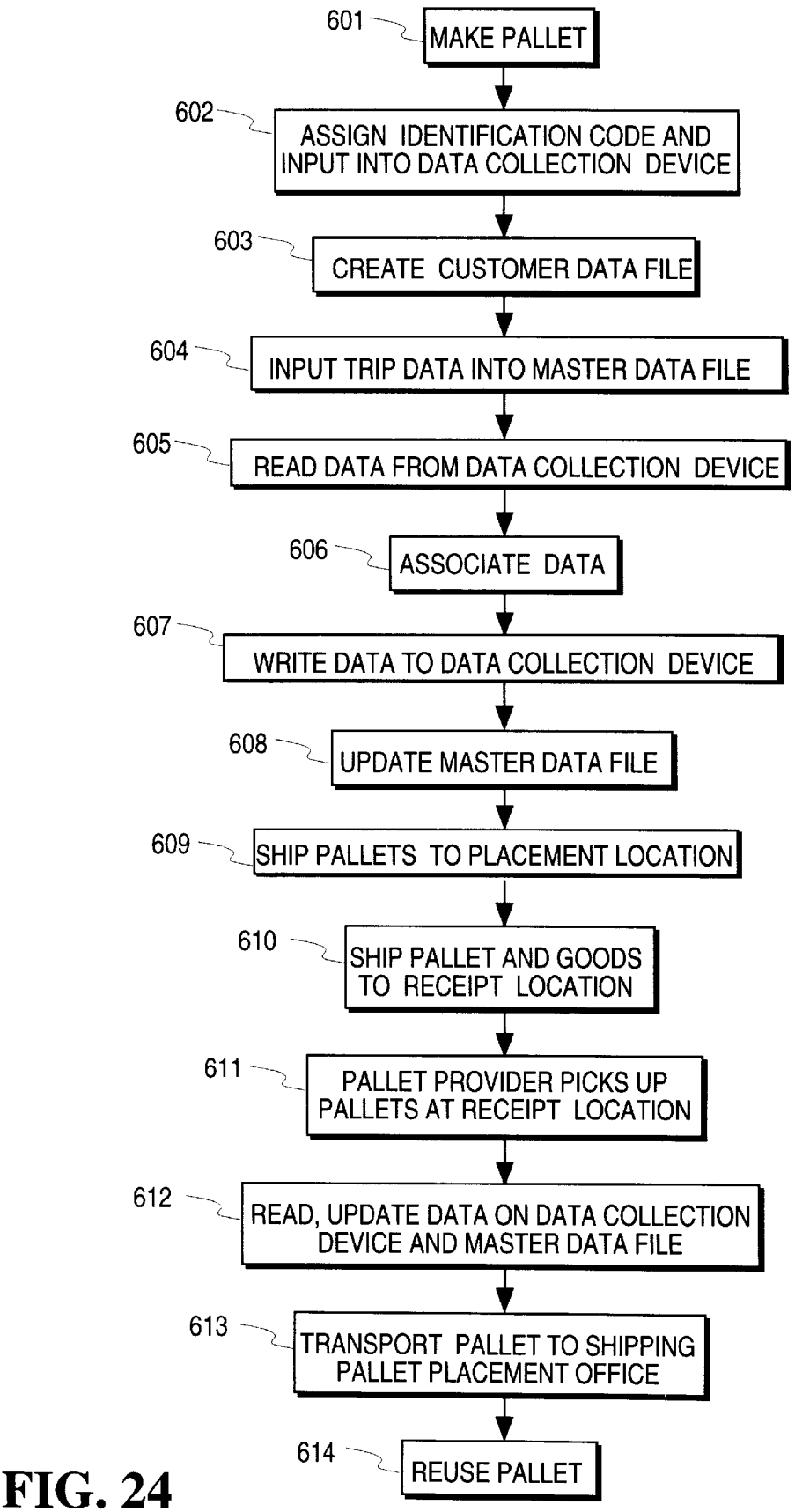
FIG. 24 illustrates the steps of the method for using shipping conveyances.

The main pallet placement office 504 will contain a main computer 512 having a computer program which allows for the storage, retrieval, and processing of information relating to customer data, pallet identification codes and trip information. Also illustrated in the diagram are two other pallet placement offices, shipping pallet placement office 503 and receiving pallet placement office 505. Each of these pallet placement offices may have a number of remote computers such as remote computers 513 and 514. These remote computers have the capability of communicating to the main pallet placement office by a computer link. Computer link 506 is shown to connect shipping placement office 503 with main pallet placement office 504. Similarly, computer link 507 is shown to connect receiving placement office 505 with main pallet placement office 504. These computer links may be dedicated electronic lines, they may be telephone lines, or they may be some type of satellite or dish communication device. There are any number of ways to allow for electronic communication between two separate points by two separate computers. In the preferred embodiment of the present invention, this computer link comprises a simple telephone line between the two points. FIG. 24 illustrates the steps of the method for using shipping conveyances. First, a pallet having a data collection device is manufactured 601. Next a unique identification code is assigned to that pallet 602. The unique identification code may be stored in the data collection device of the pallet any time after manufacture, but not before the pallets and goods are shipped to the receipt location. However, the identification code is usually placed on the pallet immediately before the first loading of trip data. The method of input of pallet identification data is dependent on the type of data storage device used. When using an EPROM or a Random Access Memory device this is accomplished by attaching a computer to the input jack and transferring the data to the pallet. The unique identification code may also be entered into the master data file once it is assigned.

Upon the receipt of an order from a customer, data regarding that customer and the order will be received by the main pallet placement office. At that time, the information regarding the customer will be input into the master data file as shown by block 603. In the preferred embodiment of the present invention, this information includes the customer name, the customer address, a rent/own code which designates whether the customer has purchased the pallets and has purchased a tracking service, or whether the customer is merely renting the pallets. Additionally, the distribution centers to which goods will be shipped are stored on the master data file as receipt locations. Similarly, the locations where goods are to be shipped from are designated as the placement locations. These placement locations are stored on the master file.

When a pallet is required at a shipping location, trip data is then input into the master data file of the main computer as shown by block 604. Of course, the trip data could also be entered into a remote data file of a remote computer and then transferred to the main computer.

Block 604 illustrates the step of reading, associating and writing data to the pallet. There are any number of methods of transferring data to and from a computer to a data collection device. This method of transfer is obviously dependent on the type of data collection device used. However, for simplicity this process is described herein with reference to an erasable programmable read only memory device located on the pallet, and by the use of data collection devices which contain connectors for the purpose of attaching electrical cables or wires to the remote computer. These connectors will be electronically connected to the erasable programmable read only memory devices. Thus, in an embodiment containing an erasable programmable read only memory device, the input of information into the data collection device is performed by connecting the remote computer to the data collection. device by attaching an electronic lead to the remote computer, the lead having a connector which connects it to the data collection device on the pallet. First, the information in the master data file is transferred from the main pallet placement office to the remote computer located at the shipping pallet placement office. The information from the main pallet placement office master data file will be stored in the remote computer which will then be connected to the pallet which is to be used.

Upon connection of the remote computer to a particular pallet, the remote computer will first read the information contained on the data collection device of the pallet as illustrated by block 605. This information will be stored on the remote computer in a remote data file. A computer program will then associate the conveyance identification number with the customer data and the trip data associated with this particular shipment as illustrated by block 606. Trip data will then be transferred from the master remote data file onto the data collection device as illustrated by block 607. Customer data such as customer name and rent/own code may also be transferred to the data collection device. The trip information which will be placed onto the data collection device includes a trip code which identifies a number of times a pallet has been used, the placement location, the shipping pallet placement office, a supplier code which designates the name of the supplier who is supplying the goods to be shipped from that particular placement location, the rental date, and the shipping code. The rental date will designate the date from which the customer has rented the particular pallet. This would usually be the date on which the information is loaded onto the data collection device. The shipping code designates the method of shipment of the article. For example, this shipping code may designate shipment by ground transport, rail, or air. Also, it may designate a particular carrier. The information described as being loaded onto a data collection device will be sequentially loaded onto all of the data collection devices located on the particular pallet.

Block 608 illustrates the step of updating the master data file. The remote computer will then be linked to the main pallet placement office and the pallet identification code and trip data will then be transferred onto the master data file which will be updated to reflect the identification code of the pallet and the associated trip data.

The steps of reading the data from the data collection device and updating the master data file could either be performed at the placement location, the receipt location, or any other convenient location. This step could be performed in a number of different ways. For example, remote electrical corrections or sensors could be directly linked to the master data file, eliminating the need for remote computers.

The pallets will then be transferred to the placement location. Block 609 illustrates this transfer, during which the pallets may be transported in the shipping configuration. At the placement location, the pallets will be placed into the hauling configuration.

The supplier will then load goods onto the pallets at the placement location and transfer and ship the goods to the receipt location. This step is illustrated by block 610. Once the goods arrive at the receipt location, as is customary in the industry, the goods will often stay on the pallet for ease of transfer and storage at the storage facilities located at the receipt location. When a customer has moved the goods off of the pallet, and when he has no further use for the pallet at the receipt location he then contacts the receiving pallet placement office. The receiving pallet placement office then picks up the pallet and returns it to the receiving pallet placement office. This step is shown by block 611 on the diagram. Preferably upon picking up the pallet at the receipt location, a receipt will be given to the customer's agent for the total units collected. After arriving back at the pallet placement office, the pallets are first placed into the shipping configuration. Next, they are inspected, cleaned, and made ready for their next use. Block 612 shows the step of reading and updating data on the data collection device and the master program. First a remote computer located at the receiving pallet placement office will be connected to the pallet. The data on the pallet will then be read by the remote computer and the data on the pallet will be updated by transmitting to the pallet the receipt date at the pallet placement office and maintenance code if any maintenance is performed on the pallet at the receiving pallet placement office. The remote computer is then linked to the main computer and the master data file is updated.

Next, as illustrated by block 613, the pallets are placed into the shipping configuration and transported to a shipping pallet placement office. Block 614 illustrates the reuse of the pallets by repeating the steps outlined in blocks 604–613. Each time reuse involves a new customer that reuse would involve repetition of the steps outlined in block 603–613. Standard inventory control methods may be used to allocate the pallets to particular pallet placement offices which require pallets, and to determine when pallets need to be sent from a receiving pallet placement office to a shipping pallet placement office.

By using this method, at any particular point in time, the main pallet placement office would be able to ascertain the location of a particular shipment order or a particular pallet by locating the records associated with the identification code of the pallet. Should any discrepancies arise or computer malfunction, or data loss occur the information may be reacquired or verified by reading the data collection device.

The main pallet placement office may then use this data to charge a customer based on the usage of a particular pallet. This charge may be based on the number of days the pallet has been used. Other factors which can determine the amount of billing include the base, the number of times a pallet is turned per year, and distances traveled. Either the remote computer or the main pallet placement office computer will contain a shipping program which prepares and prints shipping documents as well as billing documents which may be sent to the customer. Each pallet will have a trip code that is a number which designates the number of times which the pallet has been used. This number also used as an identifier for trip data. Thus, each time the pallet is used, the trip code will be updated by adding 1 to the trip code number. This trip number allows the age, availability and maintenance of individual pallets to be easily tracked based on the number of trips.

The above example is one approach which could be used to effectuate the novel method for using shipping conveyances. When using other data storage devices, it may be desireable to decrease the storage requirements of the data collection device. However, this may increase the cost and lessen the accuracy of tracking data. Additionally, this would provide room for interpretive errors and data collection errors.

The use of different data storage devices would require that different methods for transferring data to and from the computer be employed. For example, when using a bar code, a magnetic strip, or a radio frequency identification device, or even an EPROM or Random Access Memory device, physical application of a device may be employed. When using a device requiring physical application to the pallet, the information to be stored may be input into the device prior to application.

Data transfer could also be achieved by the use of reading devices designed for scanning a data storage device. Examples would include bar code scanners, magnetic strip scanners, and light sensitive scanners. Some of these scanners also allow for the input of data by using magnetism or light such as is used by light sensitive devices and magnetic data application devices.

Direct electronic data transfer may also be achieved by radio transmission (for radio frequency identification devices) or by attaching an electrical connector to the data collection device.

For various applications, different transfer methods would be employed. Also, a combination of different data storage devices and data transfer methods may be employed on any given pallet. For example, it may be desirable to use a separate data collection device for storage of pallet identification data from that used for storing customer customer data and trip data, particularly when a radio frequency identification device is used.

What is claimed is:

1. A method for using shipping conveyances comprising:
providing a data processing apparatus having a storage device for storage of conveyance identification data;
providing a shipping conveyance having a data collection device attached thereon, said data collection device including a data storage system, said data storage system allowing for the storage and retrieval of conveyance trip data and conveyance identification data;
providing an information transfer system, said information transfer system allowing for the transfer of said conveyance trip data from said data processing apparatus to said data storage system of said conveyance, said information transfer system also allowing for transfer of said conveyance trip data and said conveyance identification data from said data storage system of said conveyance to said data processing apparatus;
inputting conveyance identification data into said data collection device such that said conveyance identification data is stored in said data storage system;
inputting conveyance trip data into said data processing apparatus;
reading said conveyance identification data from said data storage system of said shipping conveyance;
associating said conveyance trip data stored in said data processing apparatus with said conveyance identification data;
transferring said conveyance trip data to said data collection device;
placing goods on said shipping conveyance at a first location and moving said goods to a second location;

removing said goods from said shipping conveyance;

transferring said conveyance identification data and said conveyance trip data from said data storage system of said shipping conveyance to said data processing apparatus;

updating said conveyance trip data; and transferring said updated conveyance trip data to said data storage system of said data collection device.

2. The method for using shipping conveyances of claim 1 wherein said conveyance trip data stored on said data collection device is read each time said conveyance identification data is read and wherein said conveyance trip data of said data collection device is compared with said conveyance trip data of said data processing apparatus.

3. The method for using conveyances of claim 2 wherein said data processing apparatus is a system comprising a first computer and a second computer, said first computer having a master data file and said second computer having a remote master data file, said information transfer system allowing for the electrical coupling of said second computer to said data collection device of said conveyance such that said conveyance trip data and said conveyance identification data may be transferred from said data storage system of said data collection device to said remote master data file of said second computer, said second computer allowing for the electrical coupling of said second computer to said first computer such that said remote master data file may be transferred from said second computer to said first computer.

4. The method for using shipping conveyances of claim 3 wherein said conveyance identification data includes a conveyance identification code, and wherein said conveyance trip data includes a designation of a location from which the conveyance is being shipped and a designation of a date on which the conveyance was rented by a customer.

5. The method for using conveyances of claim 2 wherein said data processing apparatus is a system comprising a first computer and a second computer, said first computer having a master data file and said second computer having a remote master data file, said information transfer system allowing for the electrical coupling of said second computer to said data collection device of said conveyance such that said conveyance trip data and said conveyance identification data may be transferred between said data storage system of said data collection device and said second computer, said second computer allowing for the association of said conveyance trip data and said conveyance identification data from said data collection device with said remote master data file and allowing for the update of said conveyance trip data such that the updated conveyance trip data may be transferred to said data storage system of said data collection device, said second computer also allowing for the electrical coupling of said second computer to said first computer such that said updated conveyance trip data and said conveyance identification data may be transferred from said second computer to said first computer.

6. The method for using conveyances of claim 5 wherein said identification data and said conveyance trip data stored on said data storage system are transferred to said second computer, and when said conveyance trip data is updated, said updated conveyance trip data is transferred to said data storage system of said data collection device, said updated conveyance trip data and said conveyance identification data then being electronically transferred to said first computer so as to update said master file.

7. A method for using shipping conveyances comprising:

storing customer data on a master data file of a computer;

storing conveyance identification data on a shipping conveyance;

inputting trip data and storing said trip data on said shipping conveyance and on said master data file of said computer;

moving said shipping conveyance;

reading said conveyance identification data and said trip data stored on said shipping conveyance;

updating said trip data stored on said shipping conveyance; and updating said trip data stored on said master data file of said computer.

8. The method for using shipping conveyances of claim 7 further comprising billing a customer based on said trip data of said shipping conveyance located in said master file of said computer.

\* \* \* \* \*